(12) United States Patent
Jung et al.

(10) Patent No.: US 12,429,274 B2
(45) Date of Patent: Sep. 30, 2025

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Jaehyun Bae, Seoul (KR); Duchan Ki, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 18/034,682

(22) PCT Filed: Nov. 1, 2021

(86) PCT No.: PCT/KR2021/015533
§ 371 (c)(1),
(2) Date: Apr. 29, 2023

(87) PCT Pub. No.: WO2022/092950
PCT Pub. Date: May 5, 2022

(65) Prior Publication Data
US 2023/0408169 A1 Dec. 21, 2023

(30) Foreign Application Priority Data

Nov. 2, 2020 (KR) ......................... 10-2020-0144788
Nov. 2, 2020 (KR) ......................... 10-2020-0144795

(51) Int. Cl.
*F25D 23/02* (2006.01)
*F25D 25/02* (2006.01)

(52) U.S. Cl.
CPC ........... *F25D 23/02* (2013.01); *F25D 25/022* (2013.01); *F25D 2201/14* (2013.01); *F25D 2323/021* (2013.01)

(58) Field of Classification Search
CPC ...... F25D 23/067; F25D 23/02; F25D 23/028; F25D 23/022; F25D 2201/14
See application file for complete search history.

(56) References Cited

U.S. PATENT DOCUMENTS 6,460,956 B1* 10/2002 Disbennett ............ F25D 23/067
312/406
10,852,054 B2* 12/2020 Kim ..................... F25D 23/085
(Continued)

FOREIGN PATENT DOCUMENTS

JP 2015-129634 A 7/2015
KR 10-2016-0041310 A 4/2016
(Continued)

OTHER PUBLICATIONS

International Search Report (with English Translation) and Written Opinion dated Feb. 17, 2022 issued in Application No. PCT/KR2021/015533.
(Continued)

*Primary Examiner* — Daniel J Rohrhoff
(74) *Attorney, Agent, or Firm* — KED & ASSOCIATES, LLP

(57) ABSTRACT

A vacuum adiabatic body includes a first plate, a second plate, and a seal for sealing the first plate and the second plate to provide a vacuum space. Optionally, the vacuum adiabatic body includes a supporter for maintaining the vacuum space. Optionally, the vacuum adiabatic body includes a heat transfer resistor for reducing heat transfer between the first plate and the second plate. Optionally, the vacuum adiabatic body includes a component coupler that is connected to at least one of the first and second plates and to which the component is coupled. Optionally, the vacuum adiabatic body includes a side plate extending in a height
(Continued)

direction of the vacuum space. Thus, a vacuum adiabatic body for achieving an industrial purpose is provided.

18 Claims, 20 Drawing Sheets

(56) References Cited

U.S. PATENT DOCUMENTS

| | | | | |
|---|---|---|---|---|
| 10,914,513 | B1* | 2/2021 | Dhage | F16B 37/00 |
| 11,137,201 | B2 | 10/2021 | Jung et al. | |
| 2015/0192355 | A1* | 7/2015 | Joo | F25D 29/005 |
| | | | | 312/401 |
| 2016/0003520 | A1* | 1/2016 | Wang | F25D 23/028 |
| | | | | 312/405.1 |
| 2016/0123654 | A1 | 5/2016 | Lee et al. | |
| 2016/0123655 | A1* | 5/2016 | Chow | F25D 23/067 |
| | | | | 312/405 |
| 2017/0184338 | A1 | 6/2017 | Hayashino | |
| 2018/0017314 | A1* | 1/2018 | Jeong | F25D 23/061 |
| 2020/0124343 | A1* | 4/2020 | Hunter | F25D 23/067 |
| 2020/0386471 | A1 | 12/2020 | Kang et al. | |
| 2023/0417477 | A1* | 12/2023 | Jung | F25D 23/067 |

FOREIGN PATENT DOCUMENTS

| | | |
|---|---|---|
| KR | 10-2017-0016241 A | 2/2017 |
| KR | 10-2019-0070791 A | 6/2019 |
| WO | WO 2014-095530 | 6/2014 |
| WO | WO 2017-023100 | 2/2017 |

OTHER PUBLICATIONS

Extended European Search Report dated Aug. 8, 2024 issued in Application No. 21886944.4.

* cited by examiner

[Fig. 1]
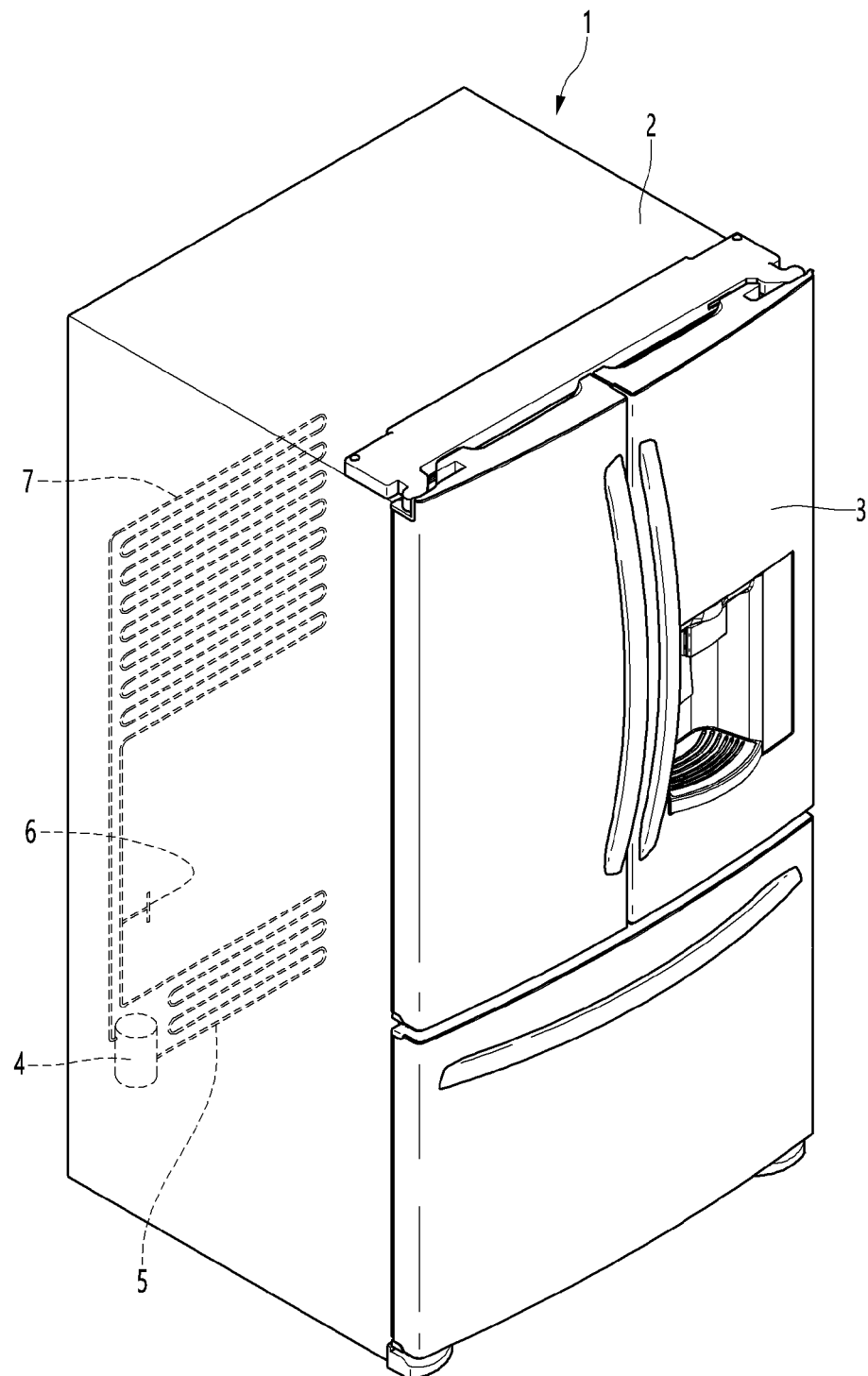

[Fig. 2]
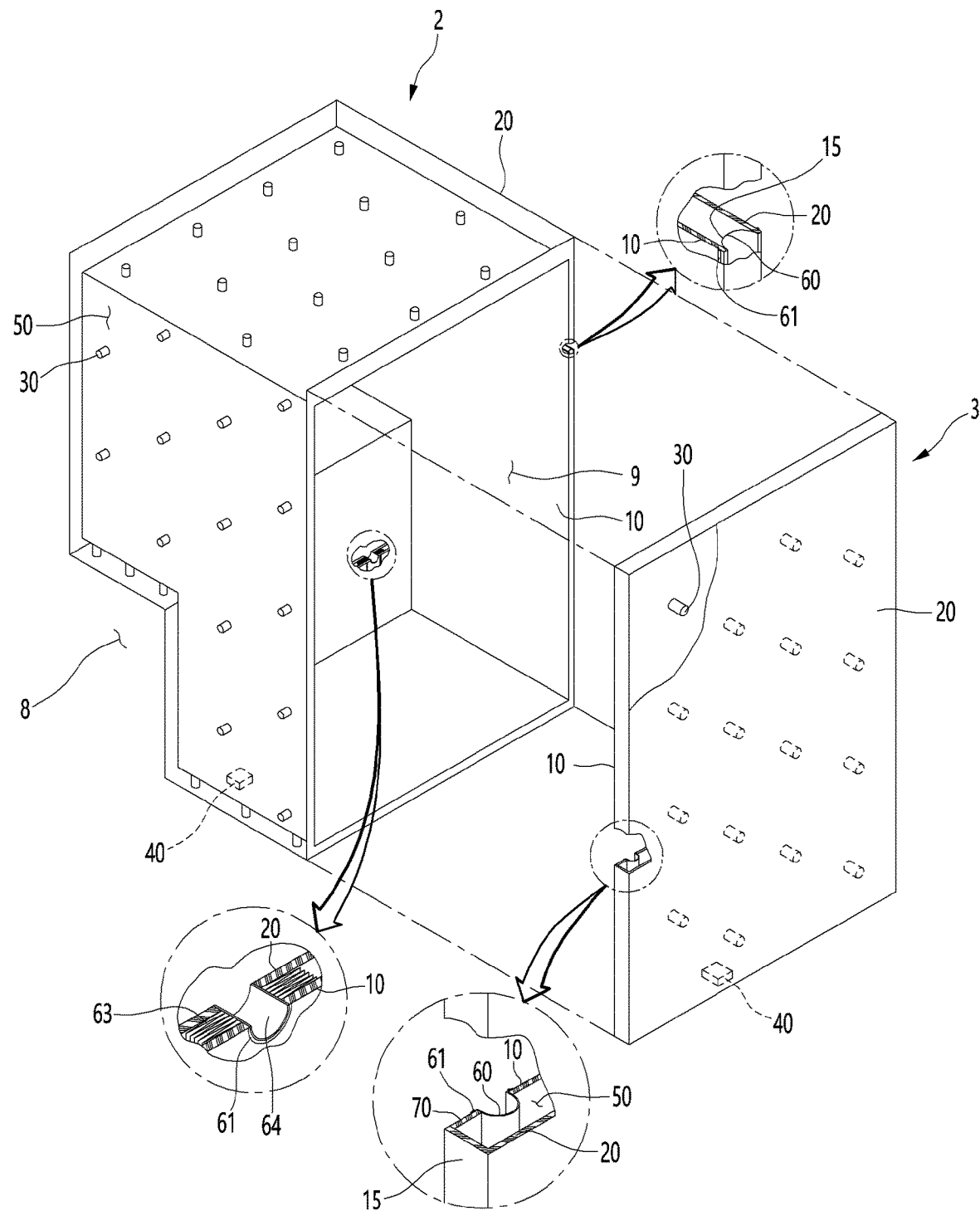

[Fig. 3]
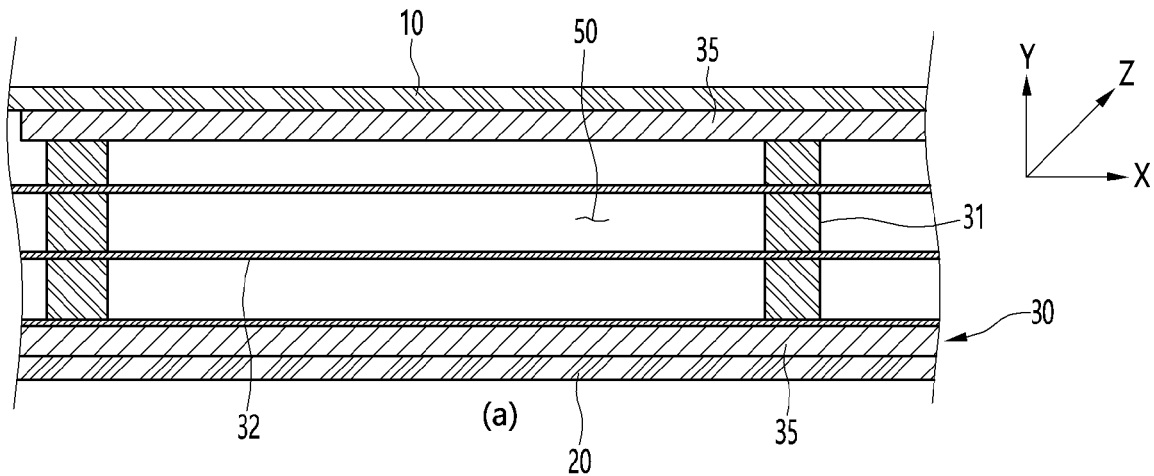
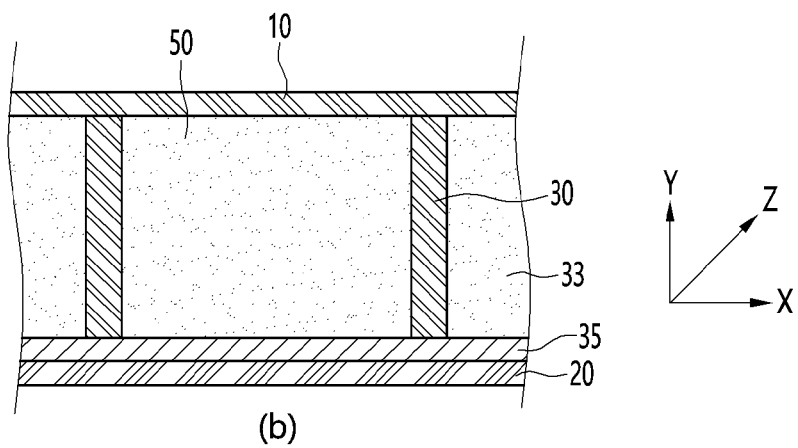
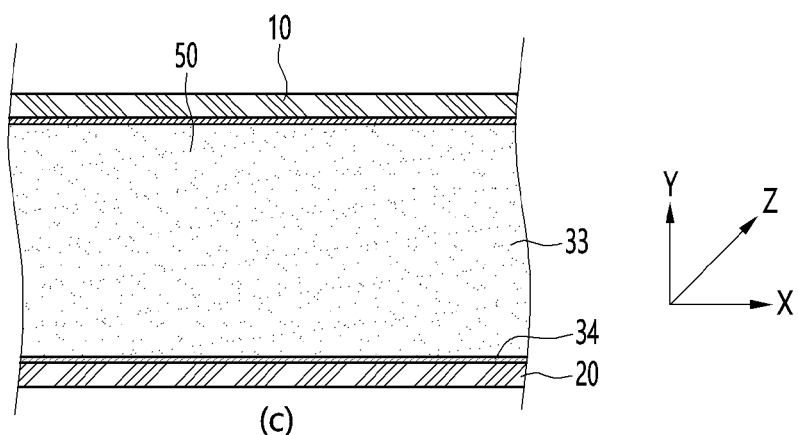

[Fig. 4]
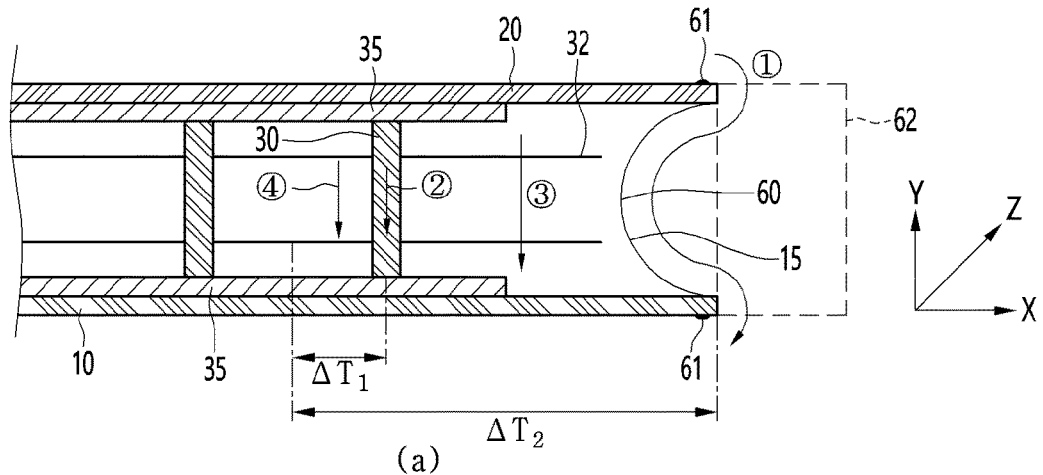
(a)
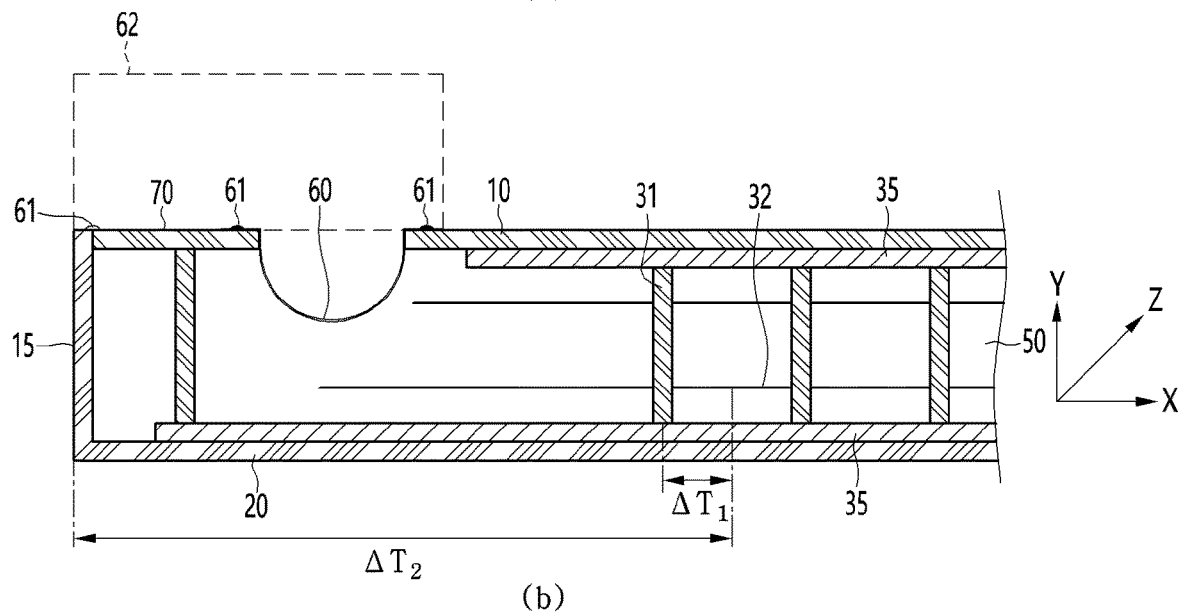
(b)
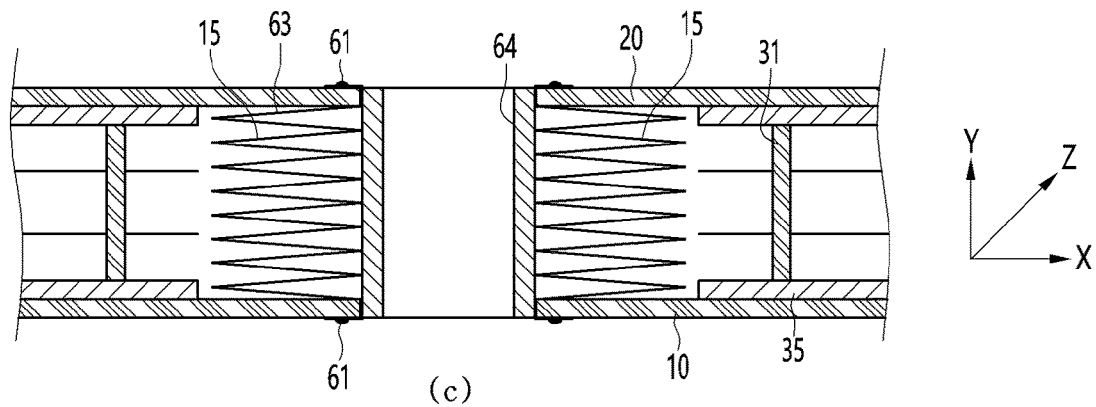
(c)

[Fig. 5]
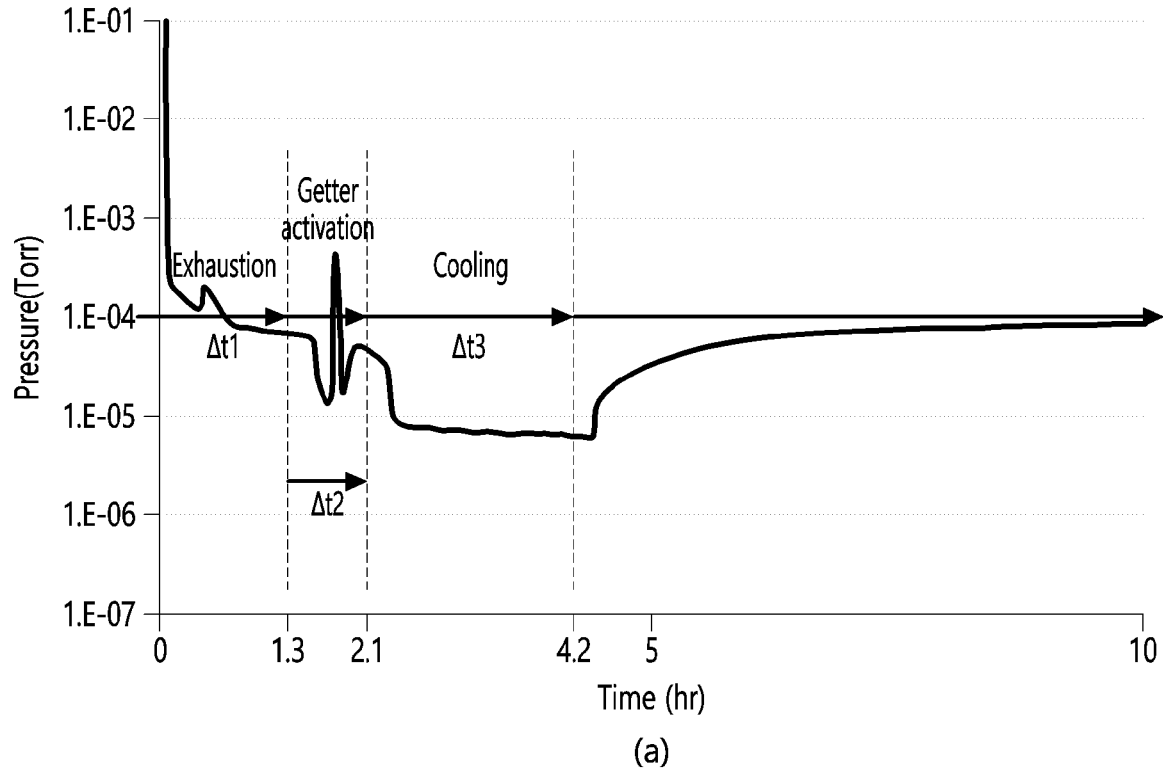
(a)
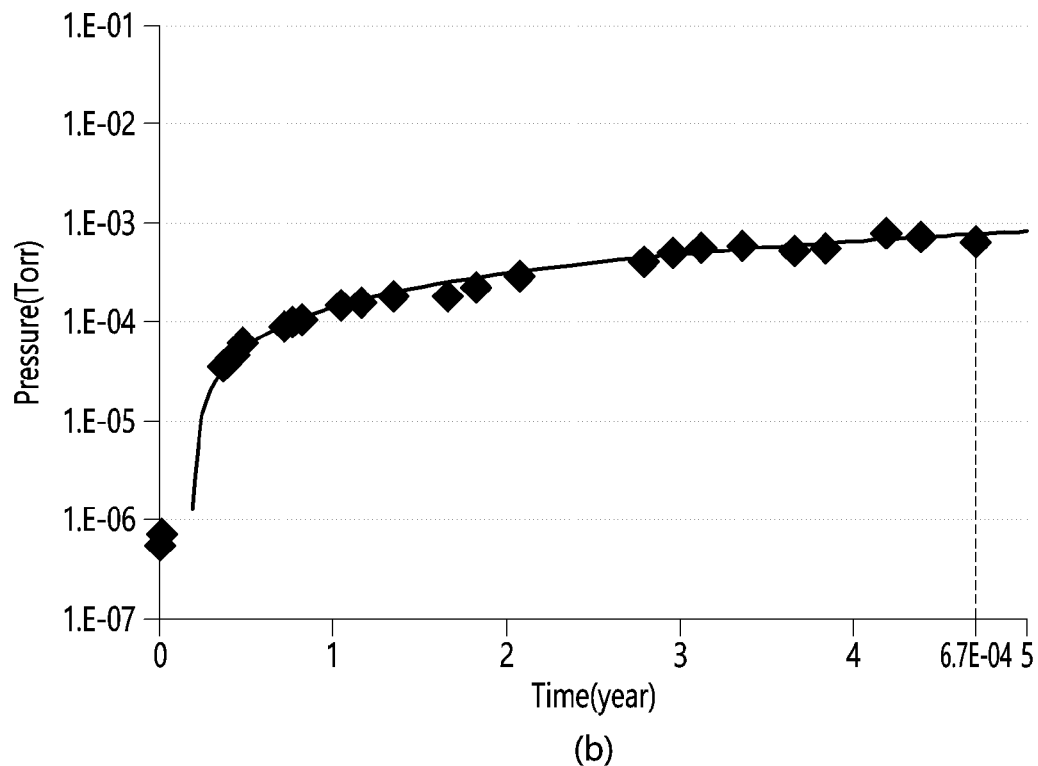
(b)

[Fig. 6]
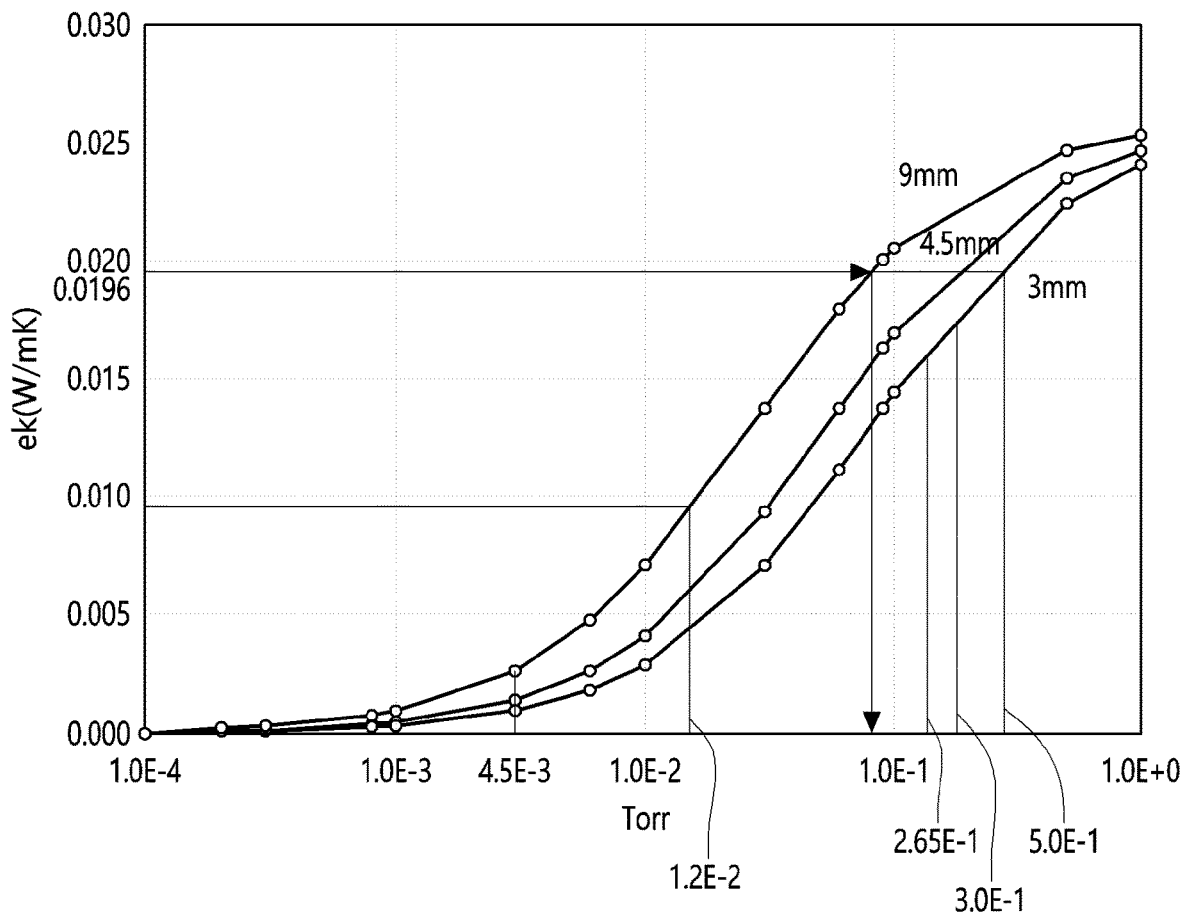

[Fig. 7]
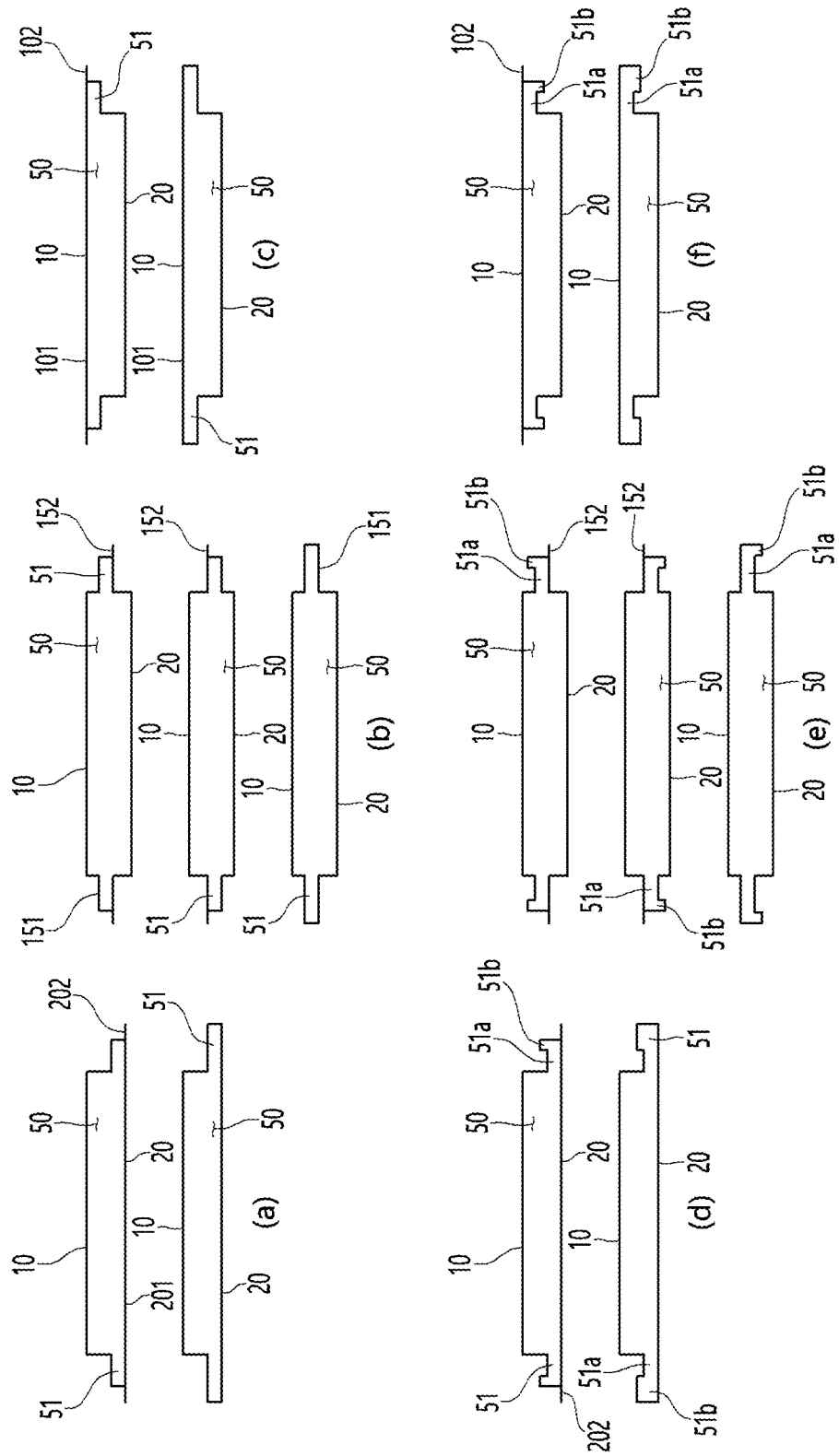

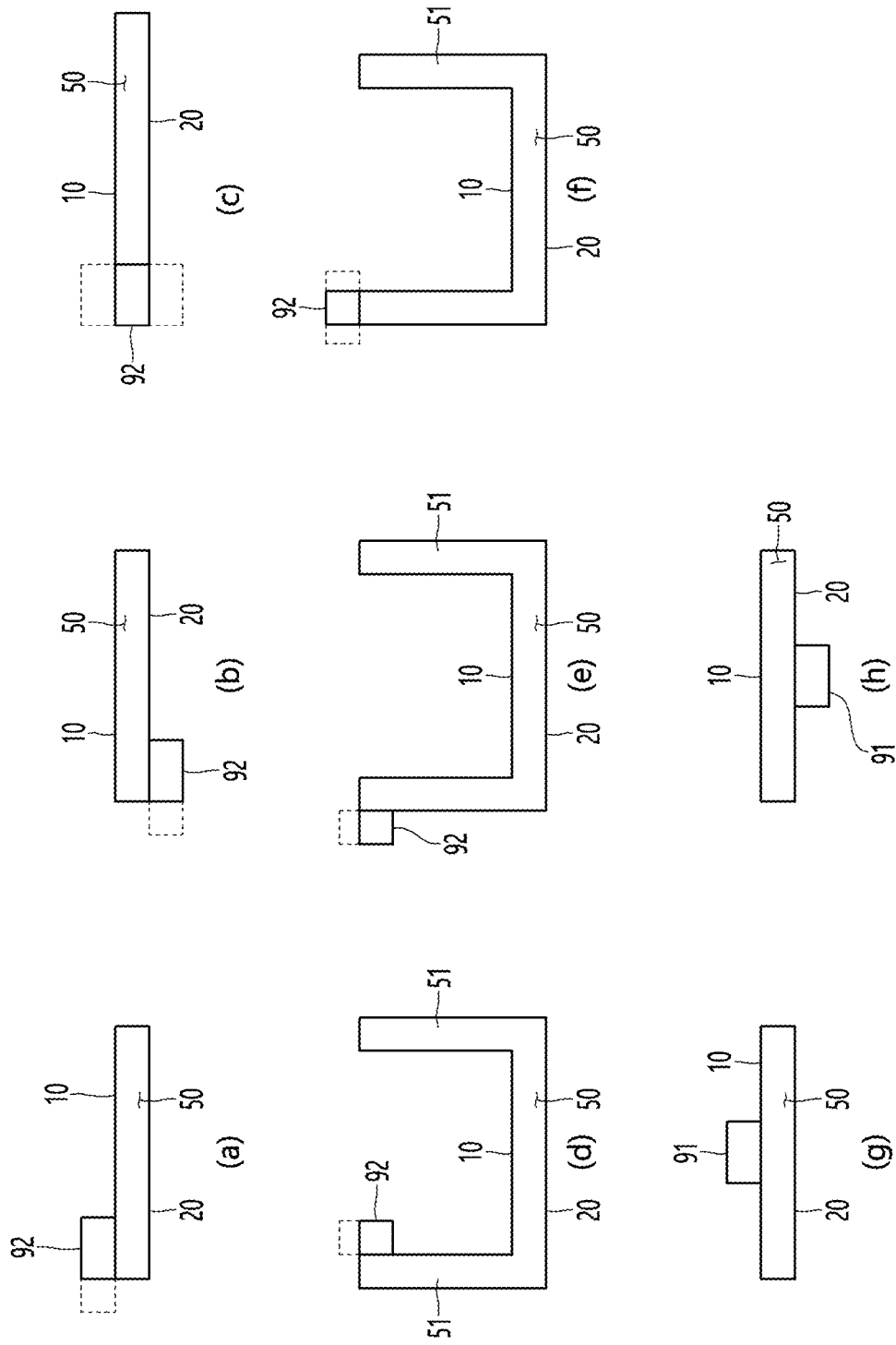
[Fig. 8]

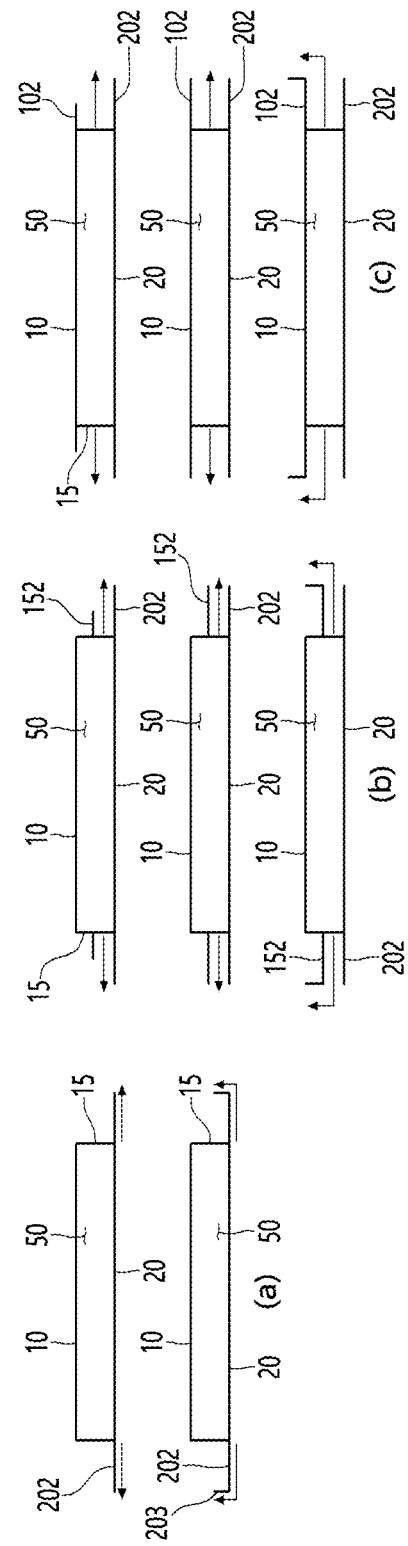

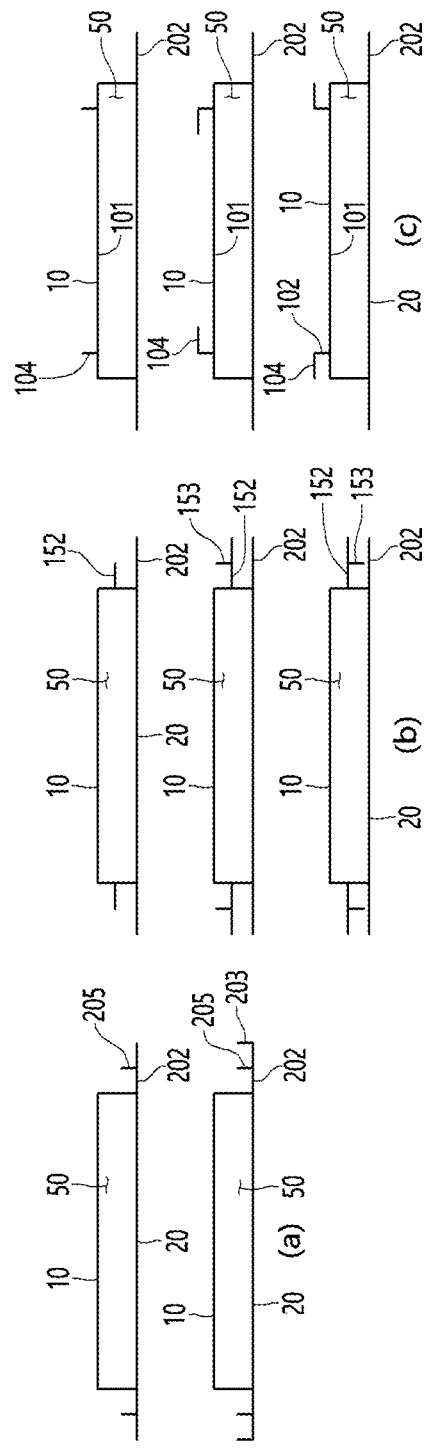
[Fig. 10]

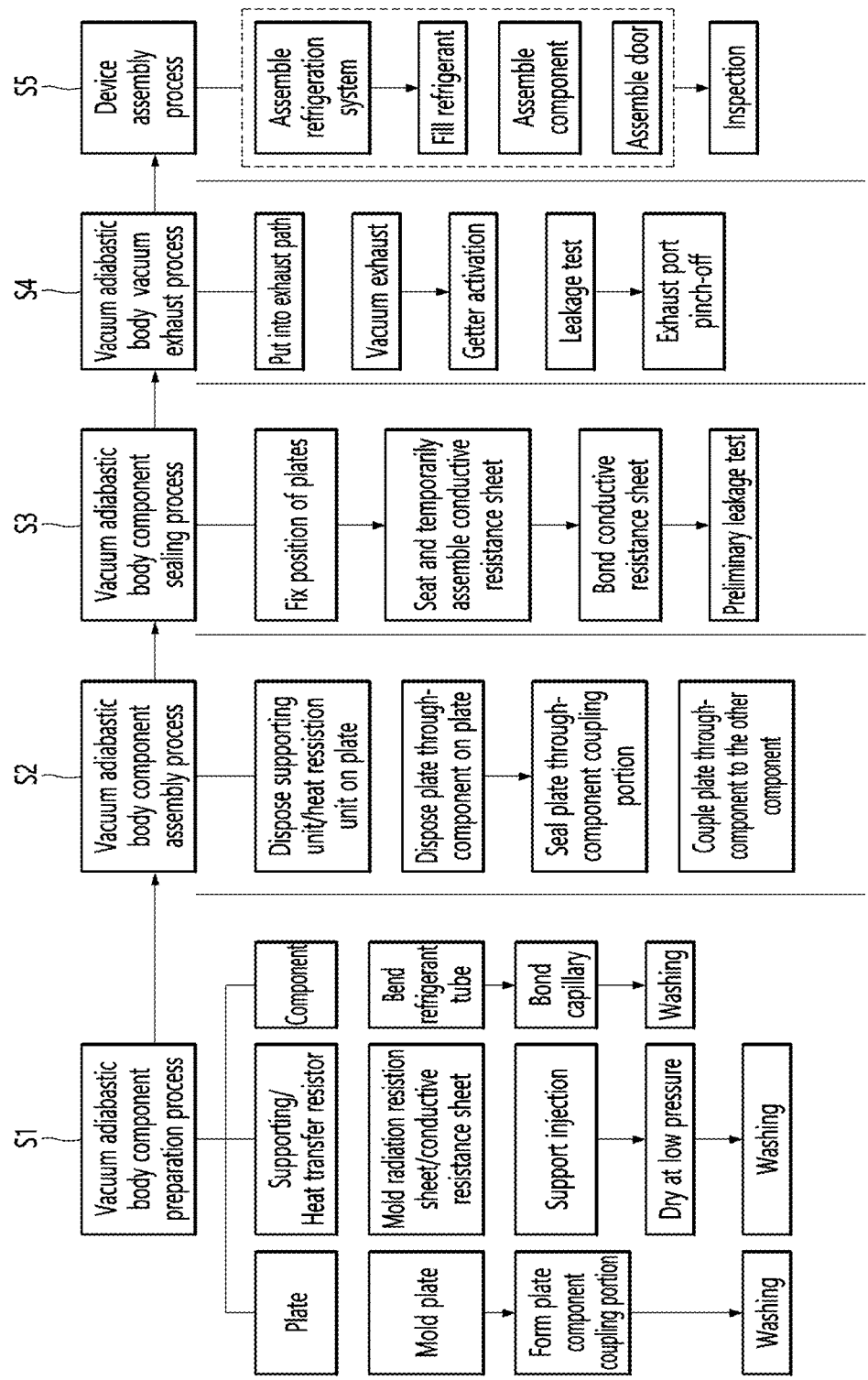
[Fig. 11]

[Fig. 12]
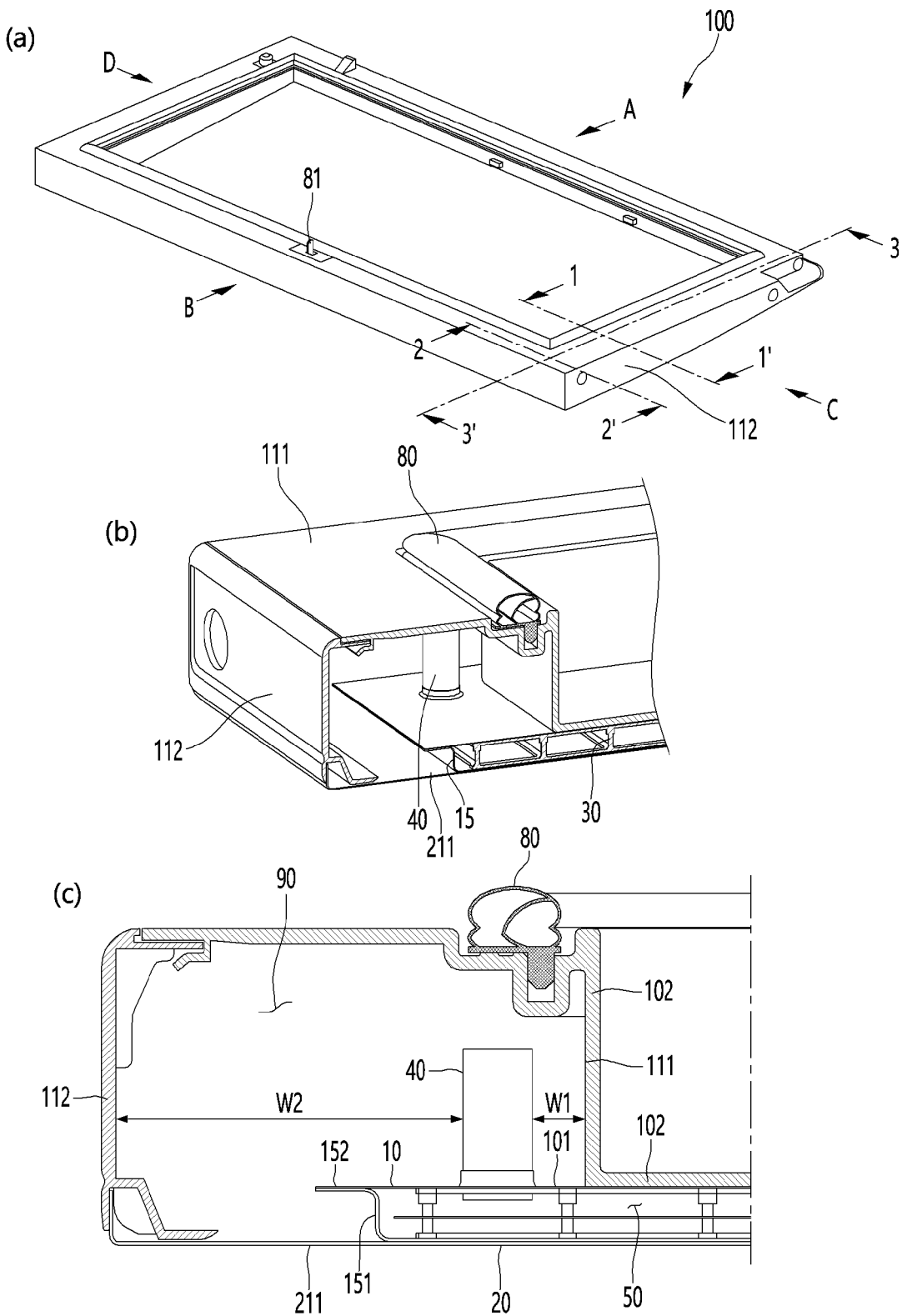

[Fig. 13]
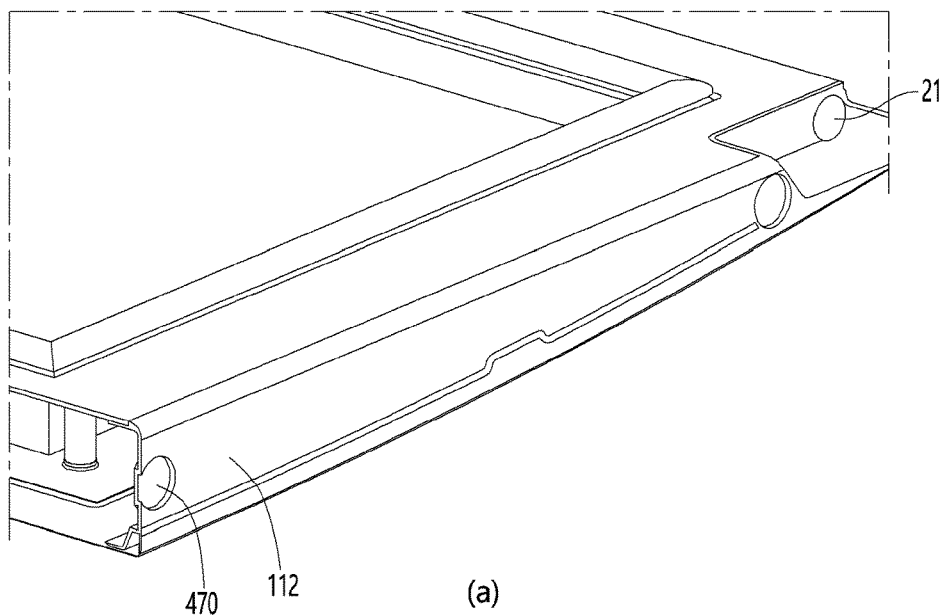
(a)
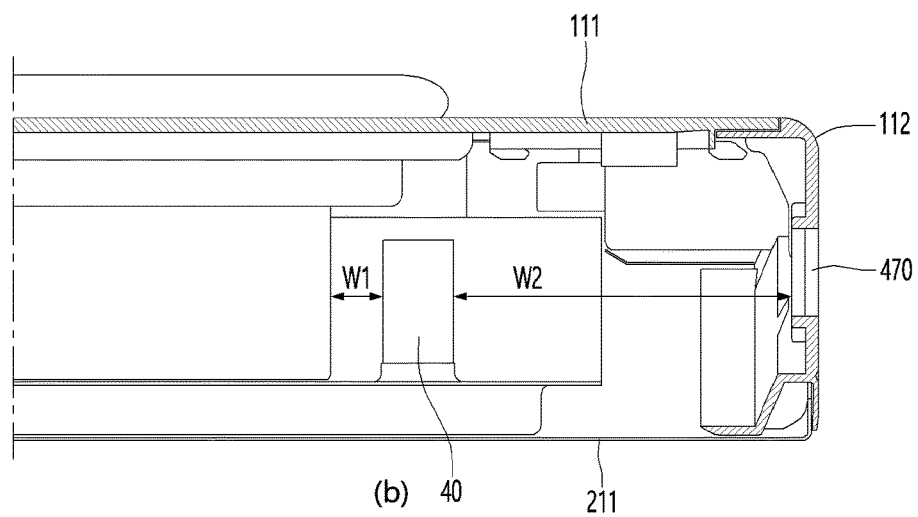
(b)
[Fig. 14]
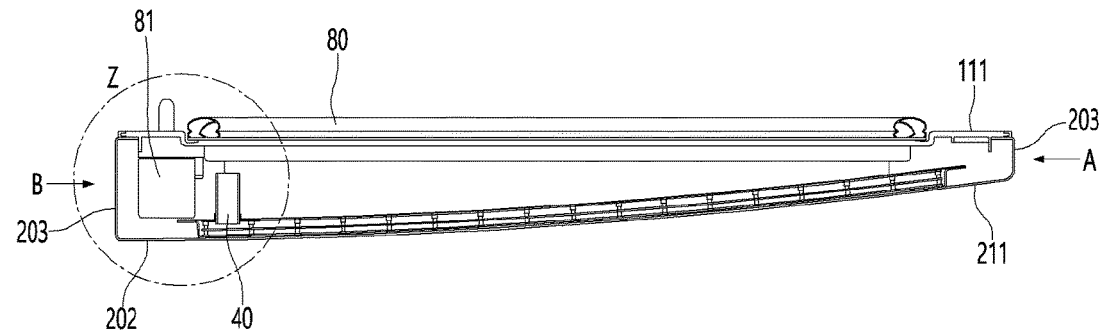

[Fig. 15]
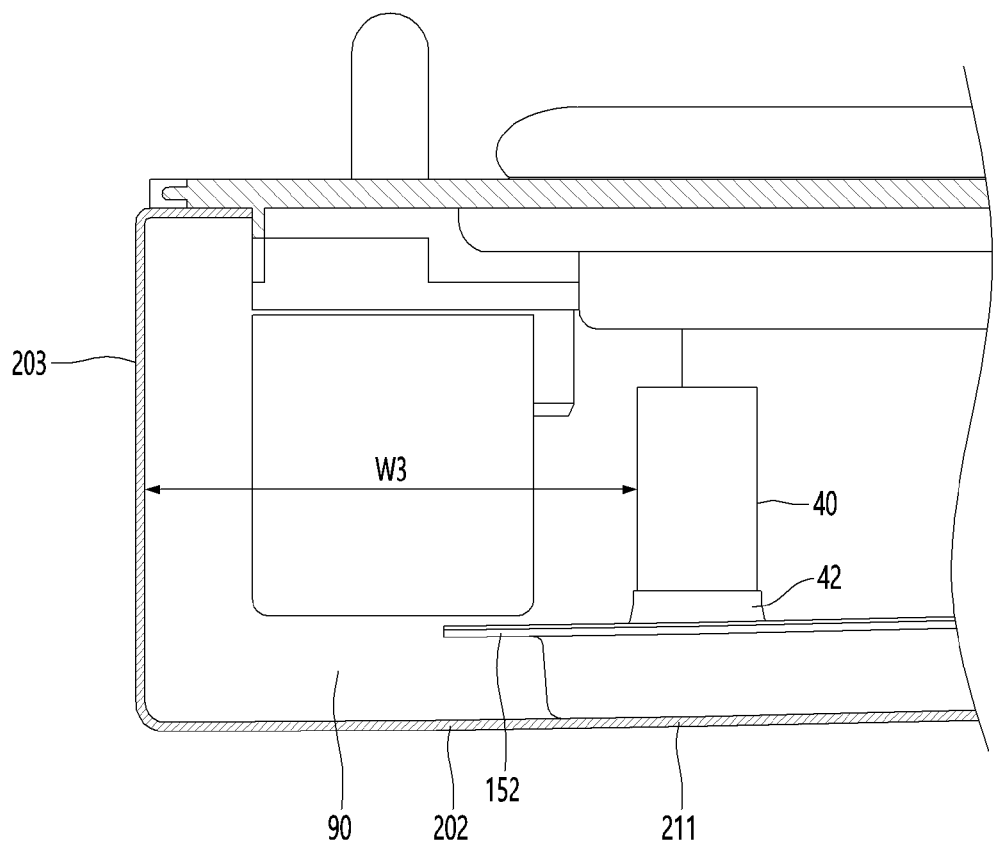
[Fig. 16]
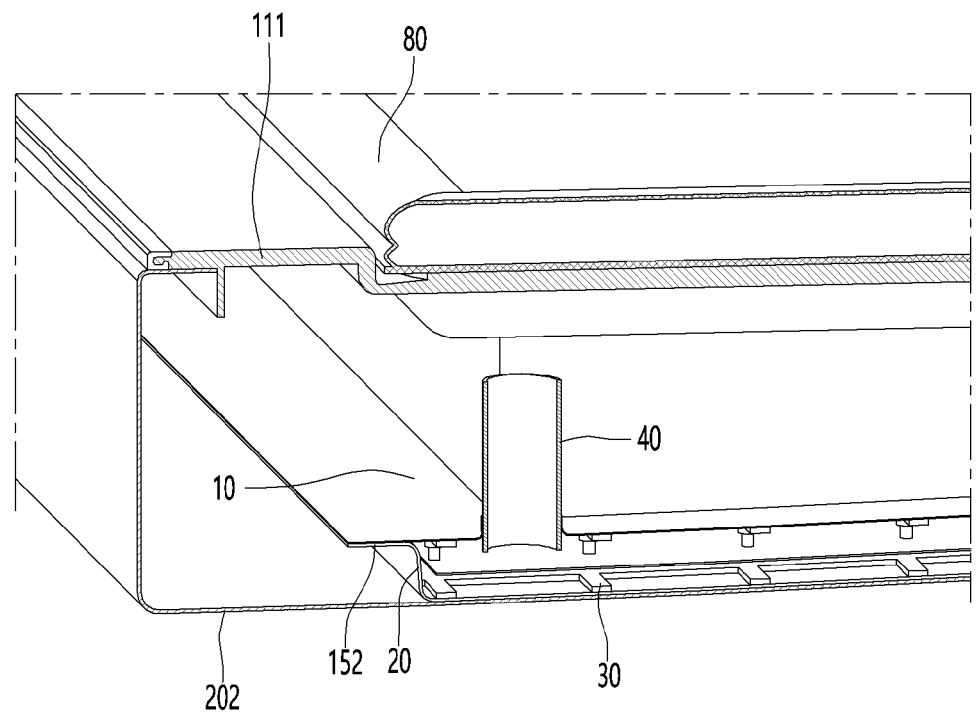

[Fig. 17]
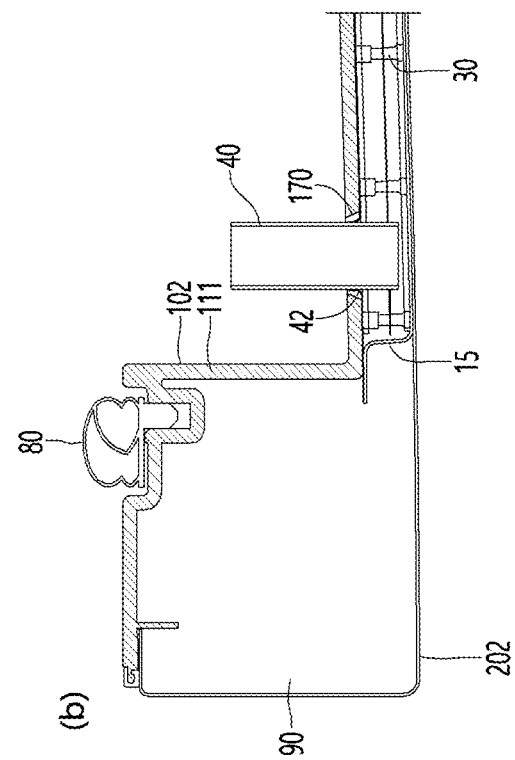
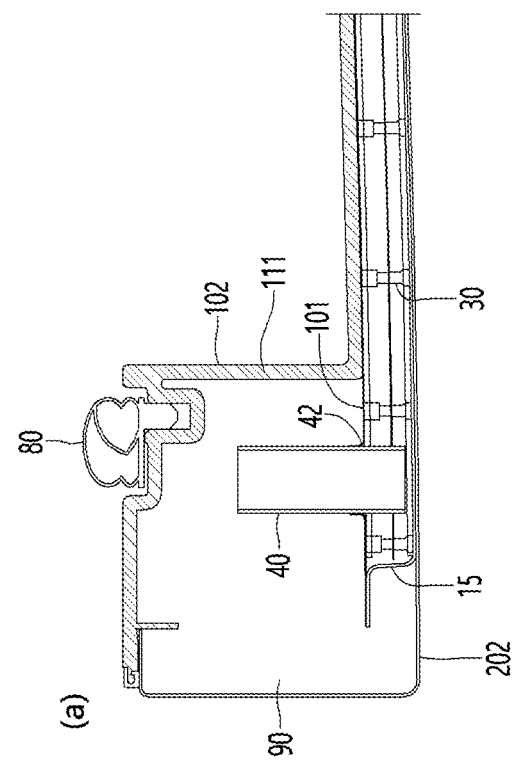

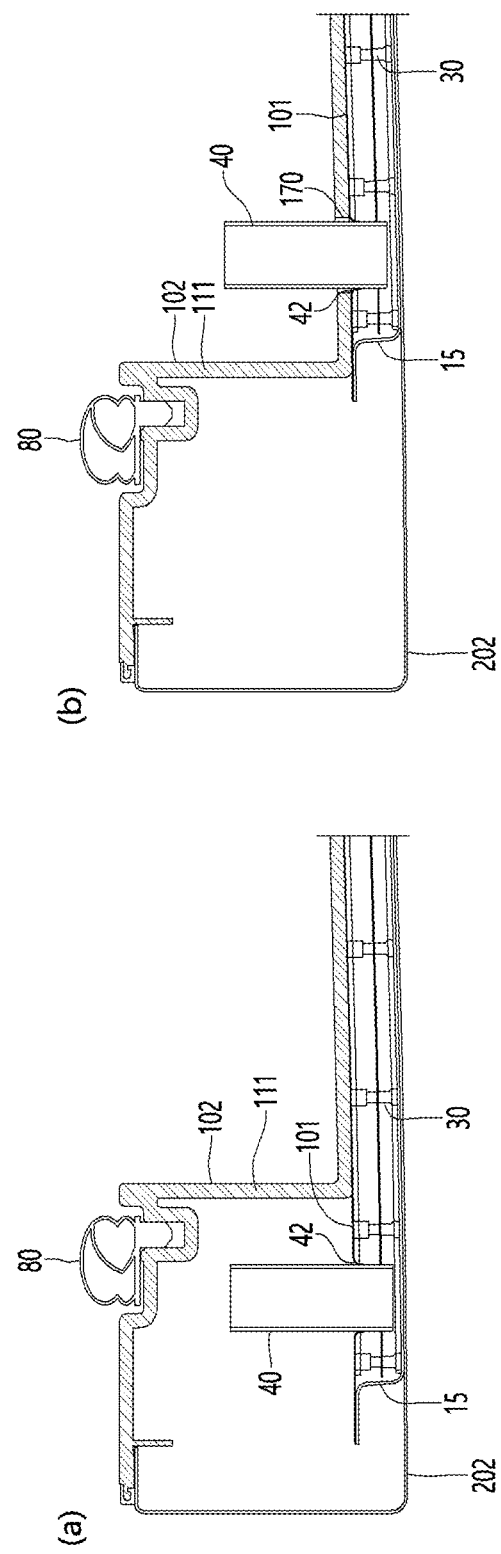
[Fig. 18]

[Fig. 19]
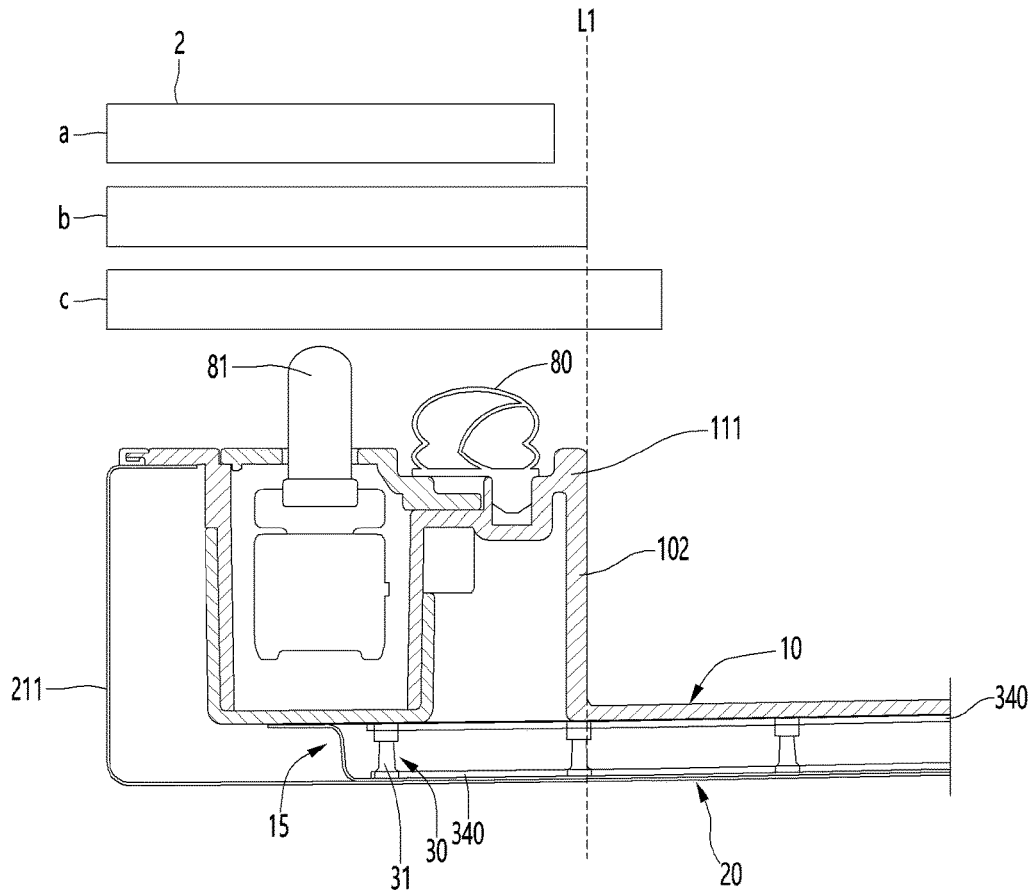
[Fig. 20]
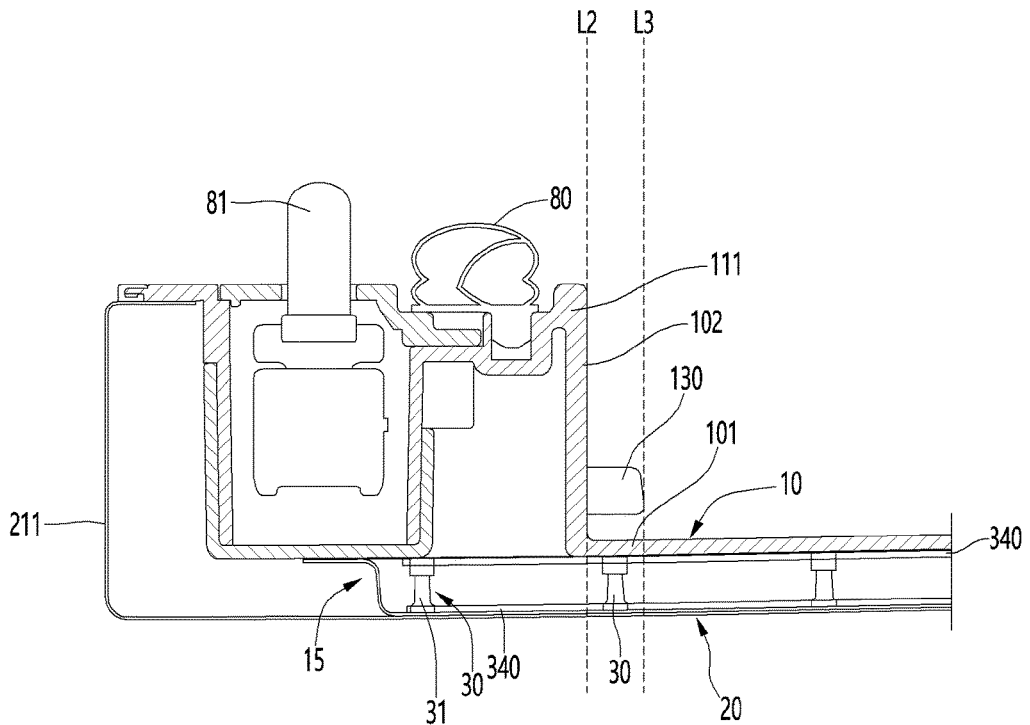

[Fig. 21]
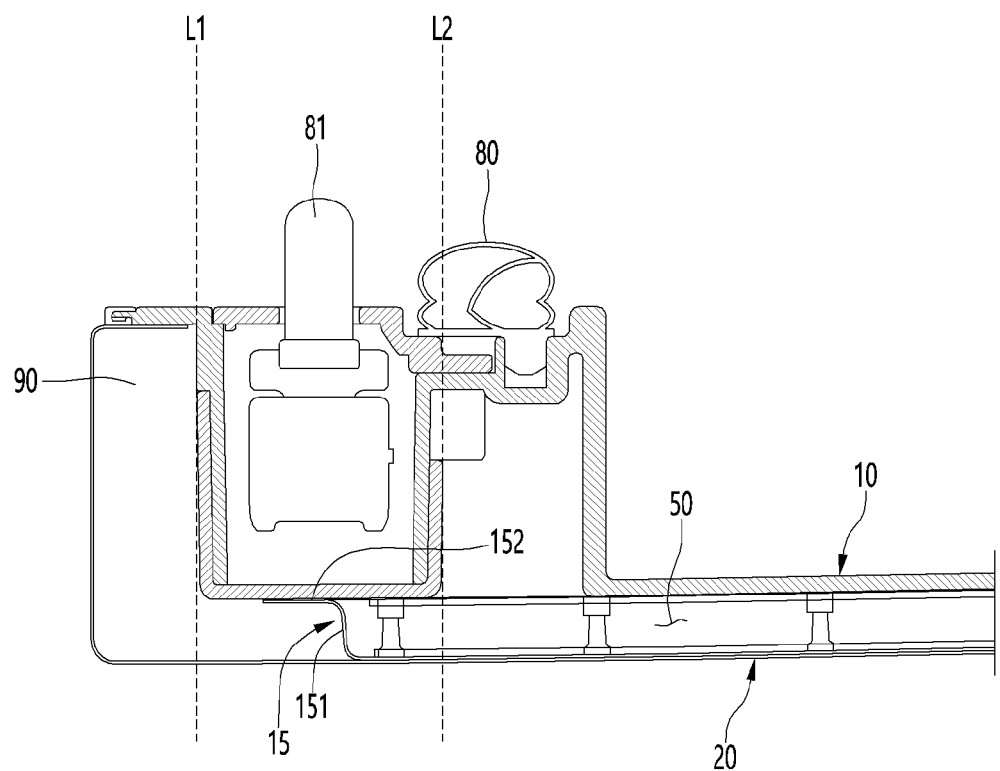

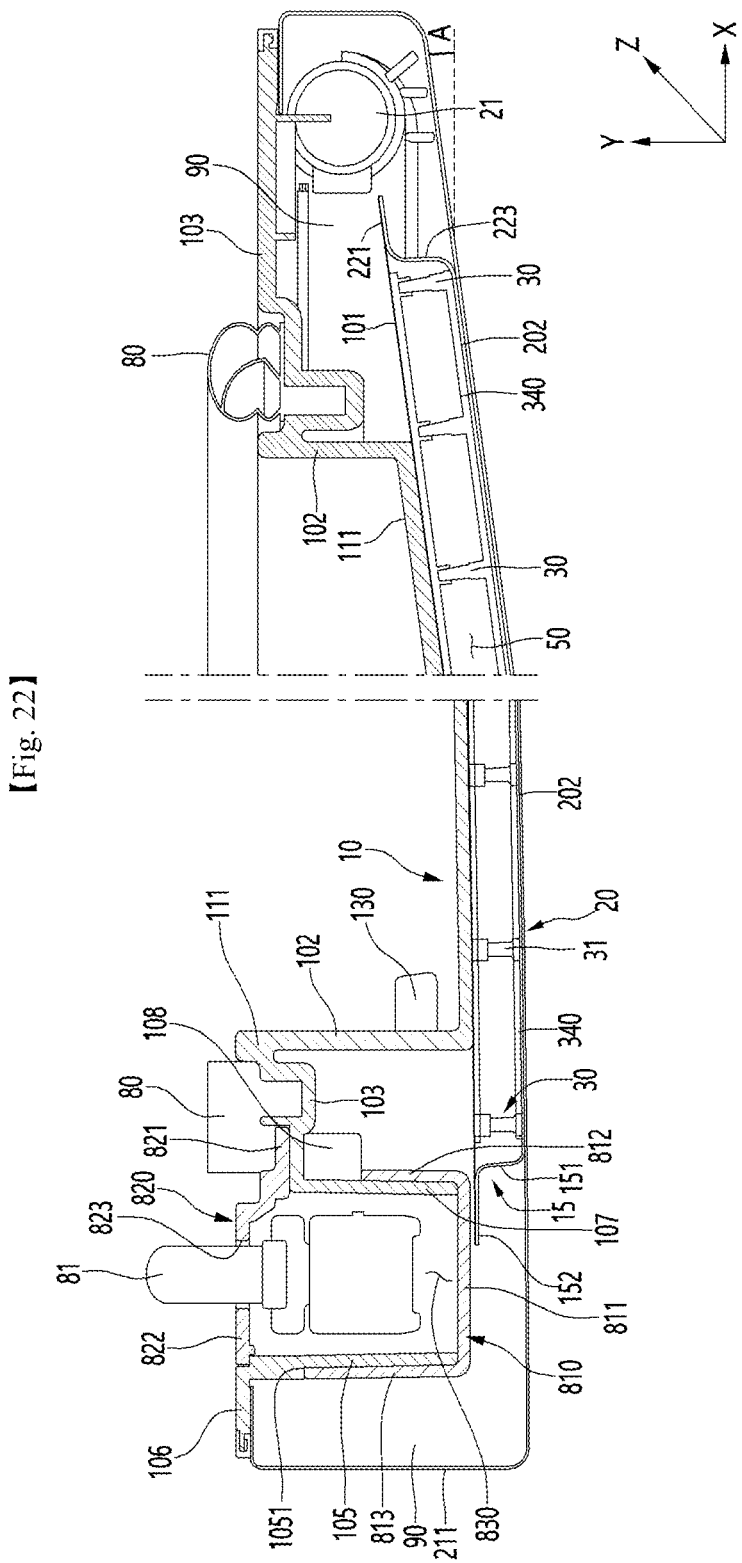
[Fig. 22]

[Fig. 23]
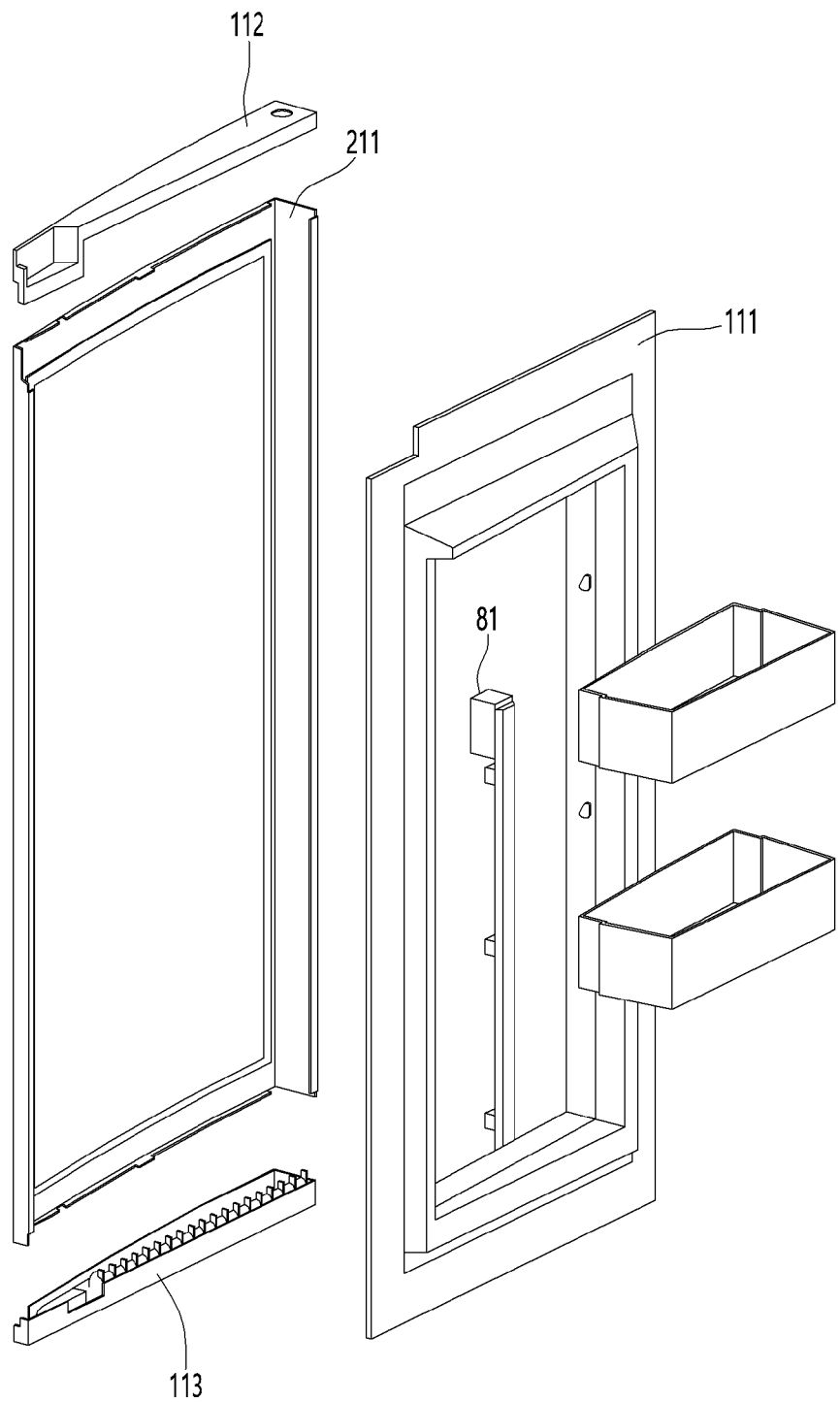

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2021/015533, filed Nov. 1, 2021, which claims priority to Korean Patent Application Nos. 10-2020-0144788 and 10-2020-0144795, both filed Nov. 2, 2020, whose entire disclosures are hereby incorporated by reference.

TECHNICAL FIELD

The present disclosure relates to a vacuum adiabatic body and a refrigerator.

BACKGROUND ART

It is possible to improve heat insulation performance by forming a vacuum in an insulating wall. A device having an internal space in which a vacuum is at least partially formed to achieve a thermal insulation effect is called a vacuum adiabatic body.

The applicant develops a technology to obtain a vacuum adiabatic body to be used in various devices and home appliances and discloses a vacuum adiabatic body in Korean Patent Application No. 10-2015-0109724. The vacuum adiabatic body disclosed in the cited reference proposes a periphery insulator positioned on a periphery of the vacuum adiabatic body.

The cited reference does not disclose a component such as a latch for installation on a refrigerator.

DISCLOSURE OF INVENTION

Technical Problem

Therefore, the present disclosure has been made in view of the above problems, and it is an object of the present disclosure to provide an installation structure of a component such as a latch required for an operation of a vacuum adiabatic body.

The present disclosure proposes a vacuum adiabatic body on which a component is reliably installed without reduction in heat insulation performance of a vacuum space.

The present disclosure proposes a vacuum adiabatic body with high impact resistance.

Solution to Problem

A vacuum adiabatic body according to the present disclosure may include a first plate, a second plate, and a seal for sealing the first plate and the second plate to provide a vacuum space. Optionally, the vacuum adiabatic body may include a supporter for maintaining the vacuum space. Optionally, the vacuum adiabatic body may include a heat transfer resistor for reducing heat transfer between the first plate and the second plate. Optionally, the vacuum adiabatic body may include a component coupler that is connected to at least one of the first and second plates and to which the component is coupled. Optionally, the vacuum adiabatic body may include at least one side plate extending in a height direction of the vacuum space. Thus, a vacuum adiabatic body for achieving an industrial purpose may be provided.

Optionally, the component and the support may at least partially overlap each other in a height direction of the vacuum space. Accordingly, an impact from the outside may be reduced.

Optionally, the component may include a latch.

Optionally, the support may include a bar extending in a height direction of the vacuum space. Optionally, when a region in which the component is placed is indicated by two imaginary lines in a height direction of the vacuum space, at least a portion of the bar may be placed in a region between the two imaginary lines. According to the configuration, an external impact may be reduced using the bar. Thus, the additional adiabatic body may be damaged from being damaged.

Optionally, the vacuum adiabatic body may include a hanger installed on the first plate to support an article. Thus, the vacuum adiabatic body may be used in a device for storing an article.

Optionally, a region of a supporter, which is positioned in a gap between extension lines extending in a height direction of the vacuum space in the hanger, may have higher strain resistance or failure strength than a region of the supporter, which does not overlap the gap between the extension lines. Thus, the strength of the vacuum adiabatic body may be increased.

Optionally, a region of a supporter, which overlaps a gap between extension lines extending in the height direction of the vacuum space in the hanger, may have higher strain resistance or failure strength than a region of the support plate, which does not overlap the gap between the extension lines.

Optionally, a region of a supporter, which overlaps a gap between extension lines extending in the height direction of the vacuum space in the hanger, may have a higher thickness than the support plate that does not overlap the gap between the extension lines.

Optionally, the bar adjacent to the gap between the extension lines extending in the height direction of the vacuum space in the hanger may have higher strain resistance or failure strength than the bar that is not adjacent to the gap between the extension lines.

Optionally, a bar adjacent to a gap between extension lines extending in a height direction of the vacuum space in the hanger may have a higher section than the bar that is not adjacent to the gap between the extension lines.

Optionally, a pitch of a bar that overlaps or is adjacent to a gap between extension lines extending in a height direction of the vacuum space in the hanger may be larger than a pitch the bar that is not adjacent to the gap between the extension lines.

According to the above configuration, the strength of the vacuum adiabatic body may be increased. According to the above configuration, the vacuum adiabatic body may be prevented from being damaged.

Optionally, a gap between extension lines extending in a height direction of the vacuum space in the hanger and at least one of the bar may overlap each other, thereby increasing the strength of the vacuum adiabatic body.

Optionally, the first plate may include a first portion of a first plate that forms the vacuum space, and a second portion of the first plate extending in a height direction of the vacuum space from the first portion of the first plate. Optionally, the hanger may be positioned adjacent to the gap between the first portion of the first plate and the second portion of the first plate. Thus, the strength of the vacuum adiabatic body may be increased.

Optionally, the hanger may be a basket hanger for supporting a basket for accommodating an article. Optionally, the basket may be a component for storing an article to cause a dynamic load and a static load. Against these loads, the basket may be prevented from being damaged.

Optionally, according to another aspect of the present disclosure, a refrigerator may include a body for accommodating an article. Optionally, the refrigerator may include a door for opening and closing the body. Optionally, the door may be provided on the vacuum adiabatic body.

Optionally, a region of a supporter, which overlaps an extension line of an internal surface of the body, may have higher strain resistance or failure strength than a region of the supporter, which does not overlap the extension line.

Optionally, the first plate may include a basket hanger for supporting a basket. Optionally, a region of the supporter, positioned in a gap between extension lines extending in a height direction of the vacuum space in a region in which the basket hanger extension line is installed, may have higher strain resistance or failure strength than a region of the supporter, which does not overlap the gap between the extension lines.

Optionally, a region of the support plate, which overlaps an extension line of the internal surface of the body, may have higher strain resistance or failure strength than a region of the support plate, which does not overlap the extension line.

Optionally, the support plate that overlaps the extension line of the internal surface of the body may have a higher thickness than the support plate that does not overlap the extension line.

Optionally, the bar adjacent to the extension line of the internal surface of the body may have higher strain resistance or failure strength than the bar that is not adjacent to the extension line.

Optionally, the bar adjacent to the extension line of the internal surface of the body may have a larger cross-sectional area than the bar that is not adjacent to the extension line.

Optionally, a pitch of the bar that overlaps or is adjacent to the extension line of the internal surface of the body may be higher than a pitch of the bar that is not adjacent to the extension line.

Optionally, the extension line of the internal surface of the body and at least one of the bar may overlap each other.

Optionally, damage of the tube 40 may include deformation of a coupler of the tube 40 and the first plate 10, and/or expansion damage of seals of the first plate 10 and the tube 40.

Optionally, the tube may be ports such as an exhaust port and/or a getter port.

Optionally, the third portion 203 of the second plate may be placed at edges of the first side and/or the second side.

Optionally, the flange 42 may be prevented from interfering with the support 30 and/or the heat transfer resistor.

Optionally, the support 30 and/or the heat transfer resistor may be installed using various methods.

Optionally, the basket and/or the basket hanger may apply a load to the first plate 10. The load may include a static load applied to the first plate as the gravity of the article placed in the basket. An impact applied when the article is placed in the basket may include a dynamic load applied to the first plate. The load may include a static load due to gravity, a static load of the basket protrusion, and/or a dynamic load of an accommodated article.

Optionally, a gap by the damage of the foam member may interfere with the action of at least one of a magnet, a rod, the gasket 80, a switch, a damper, a power switch, a heater mounted inside the door, an electric wire, and a water supply line, which are placed in the additional adiabatic body 90.

Optionally, the latch may be a device that is installed on the door. The latch may couple and/or lock the door to the body 2.

Optionally, a space in which the additional adiabatic body is placed may be defined as an internal portion of at least one of the first plate, the second plate, and the side plate. At least one of the internal panel 111, an external panel 112, the upper cover 112, the lower cover 113, and the latch 81 may be further installed.

According to the above configuration, the strength of the vacuum adiabatic body may be increased.

Advantageous Effects of Invention

According to the present disclosure, strength to withstand the inevitably generated impact due to use of a vacuum adiabatic body may be increased.

According to the present disclosure, a component such as a latch may be installed on an additional adiabatic body, thereby preventing reduction in heat insulation performance in the component.

According to the present disclosure, the amount of impact generated by a latch or the like may be smoothly absorbed.

The present disclosure may provide an industrially applicable vacuum adiabatic body by improving the productivity of the vacuum adiabatic body.

According to the present disclosure, the strength of the vacuum adiabatic body and the refrigerator may be increased to further increase impact resistance.

According to the present disclosure, a foam member placed on an additional adiabatic body may be prevented from being damaged.

BRIEF DESCRIPTION OF DRAWINGS

FIG. 1 is a perspective view of a refrigerator according to an embodiment.

FIG. 2 is a schematic view illustrating a vacuum adiabatic body used for a body and a door of the refrigerator.

FIG. 3 is a view illustrating an example of a support that maintains the vacuum space.

FIG. 4 is a view for explaining an example of a vacuum adiabatic body based on a heat transfer resistor.

FIG. 5 is a graph for observing a process of exhausting the inside of the vacuum adiabatic body with a time and pressure when the support is used.

FIG. 6 is a graph illustrating results obtained by comparing the vacuum pressure with gas conductivity.

FIG. 7 is a view illustrating various examples of the vacuum space.

FIG. 8 is a view for explaining another adiabatic body.

FIG. 9 is a view for explaining a heat transfer path between first and second plates having different temperatures.

FIG. 10 is a view for explaining a branch portion on the heat transfer path between first and second plates having different temperatures.

FIG. 11 is a view for explaining a process of manufacturing the vacuum adiabatic body.

FIG. 12 is a set of a perspective view and a partial cross-sectional view of a vacuum adiabatic body, FIG. 12a is a diagram showing a vacuum adiabatic body with a left side being a bottom and a right side being a top, FIG. 12b is a sectional perspective view taken along 1-1' of FIG. 12a, and FIG. 12c is a cross-sectional view taken along 1-1'. In the drawings, a foam member is removed.

FIG. 13 is a set of a sectional perspective view and a cross-sectional view for explaining a section taken along 2-2' of FIG. 12a, FIG. 12a is a sectional perspective view, and FIG. 12b is a cross-sectional view.

FIGS. 14 to 16 are drawings related to a section taken along 3-3' of FIG. 12a, FIG. 14 is a cross-sectional view taken along 3-3' of FIG. 12a, FIG. 15 is an enlarged view of a section of a portion Z of FIG. 14, and FIG. 16 is a sectional perspective view.

FIGS. 17 and 18 are diagrams showing a flange according to embodiments and propose the cases with different extension directions of flanges and different positions of the flanges according to embodiments.

FIG. 19 is a cross-sectional view of a periphery of a vacuum adiabatic body according to an embodiment.

FIG. 20 is a cross-sectional view of another periphery of a vacuum adiabatic body according to an embodiment.

BEST MODE FOR CARRYING OUT THE INVENTION

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3a, as an embodiment, the support may include a bar 31 and a connection plate and support plate 35. The connection plate and the supporting plate may be designed separately. Referring to FIG. 3b, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3c, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta 1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time t1a may be greater than or equal to about 0.5 hr and less than or equal to about 1 hr. The time t1b may be greater than or equal to about 24.0 hr and less than or equal to about 65 hr. The time Δt1 may be about 1.0 hr or more and about 48.0 hr or less. The time Δt1 may be about 2 hr or more and about 24.0 hr or less. The time Δt1 may be about 3 hr or more and about 12.0 hr or less. In this case, it may be the vacuum adiabatic body that needs to maintain the Δt1 as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time Δt1 may be a time t1a or more and a time t1b or less. The time t2a may be greater than or equal to about 0.1 hr and less than or equal to about 0.3 hr. The time t2b may be greater than or equal to about 1 hr and less than or equal to about 5.0 hr. The time Δt2 may be about 0.2 hr or more and about 3.0 hr or less. The time Δt2 may be about 0.3 hr or more and about 2.0 hr or less. The time Δt2 may be about 0.5 hr or more and about 1.5 hr or less. In this case, even if the time Δt2 is kept as short as possible, the sufficient outgassing through the getter may be applied to the vacuum adiabatic body. In the vacuum adiabatic body vacuum exhaust process, the time Δt3 may be a time t3a or more and a time t3b or less. The time t2a may be greater than or equal to about 0.2 hr and less than or equal to about 0.8 hr. The time t2b may be greater than or equal to about 1 hr and less than or equal to about 65.0 hr. The tine Δt3 may be about 0.2 hr or more and about 48.0 hr or less. The time Δt3 may be about 0.3 hr or more and about 24.0 hr or less. The time Δt3 may be about 0.4 hr or more and about 12.0 hr or less. The time Δt3 may be about 0.5 hr or more and about 5.0 hr or less. After the heating or drying process is performed during the exhaust process, the cooling process may be performed. For example, when the heating or drying process is performed for a long time, the time Δt3 may be long. The vacuum adiabatic body according to the present disclosure may be manufactured so that the time Δt1 is greater than the time Δt2, the time Δt1 is less than or equal to the time Δt3, or the time Δt3 is greater than the time Δt2. The following relational expression is satisfied: Δt2<Δt1≤Δt3. The vacuum adiabatic body according to an embodiment may be manufactured so that the relational expression: Δt1+Δt2+Δt3 may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: Δt1+Δt2+Δt3 may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04Torr even after about 16.3 years, and the other product may be provided so that the vacuum pressure is maintained below about 1.0E-04Torr even after about 17.8 years. As described above, the vacuum pressure of the vacuum adiabatic body may be used industrially only when it is maintained below a predetermined level even if there is a change over time.

FIG. 5a is a graph of an elapsing time and pressure in the exhaust process according to an example, and FIG. 5b is a view explaining results of a vacuum maintenance test in the acceleration experiment of the vacuum adiabatic body of the refrigerator having an internal volume of about 128 liters. Referring to FIG. 5b, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about $1.0\times10^{-1}$ Torr or be greater than about 4.5E-3 Torr and less than about 5E-1 Torr. Here, the A may be greater than or equal to about $1.0\times10^{-6}$ Torr and less than or equal to about 1.0E-5 Torr. The A may be greater than or equal to about $1.0\times10^{-5}$ Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8*a* to 8*f,* another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8*g* to 8*h,* another adiabatic body may include a central adiabatic body. The central adiabatic body may be disposed on at least a portion of a central portion of the vacuum adiabatic body, a central portion of the first plate, or a central portion of the second plate.

Referring to FIG. 8*a,* the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8*b,* the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8*c,* the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8*d,* the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8*e* and 8*f,* in the peripheral adiabatic body, the vacuum space extension portion may be disposed on a periphery of the second plate or the side plate. The same explanation as in FIG. 8*d* may be applied. Referring to FIG. 8*g,* the central adiabatic body 91 may be placed on a central portion of the first plate. The central adiabatic body may improve adiabatic performance of the central portion of the first plate. Referring to FIG. 8*h,* the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a,* the second plate may include the extension portion extending to the periphery of the second plate. Here, the extension portion may further include a portion extending backward. Referring to FIG. 9*b,* the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9c, the first plate may include the extension portion extending to the periphery of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10a, the second plate may include the branched portion 205. The branched portion may be provided in plurality, which are spaced apart from each other. The branched portion may include a third portion 203 of the second plate. Referring to FIG. 10b, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10c, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10a, 10b, and 10c may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with the support is as follows. The present disclosure may be any one of the following examples or a combination of two or more examples. The vacuum adiabatic body component preparation process may include a process of manufacturing the support. Before the vacuum adiabatic body vacuum exhaust process is performed, the process of manufacturing the support may be performed. For example, the support may be manufactured through the injection. Optionally, before the vacuum adiabatic body vacuum exhaust process is performed, the process of washing the support may be performed. Before the vacuum adiabatic body vacuum exhaust process is performed or while the vacuum adiabatic body vacuum exhaust process is performed, a process of storing the support under a predetermined condition may be performed. For example, before the vacuum adiabatic body vacuum exhaust process is performed, a primary storage process may be performed, and while the vacuum adiabatic body vacuum exhaust process is performed, a secondary storage process may be performed. For another example, during the vacuum adiabatic body vacuum exhaust process is performed, the storage process may be performed. Examples of the storage process are as follows. As a first example, the storage process may include a process of drying or heating the support. Thus, the outgas sing form the support may be performed. The heating temperature may be greater than a predetermined reference temperature and less than a melting point of the support. The predetermined reference temperature may be a temperature between about 10 degrees and about 40 degrees. The heating temperature may be greater than about 80 degrees and less than about 280 degrees. The heating temperature may be greater than about 100 degrees and less than about 260 degrees. The heating temperature may be greater than about 120 degrees and less than about 240 degrees. The heating temperature may be greater than about 140 degrees and less than about 220 degrees. The heating temperature may be greater than about 160 degrees and less than about 200 degrees. The heating temperature may be greater than about 170 degrees and less than about 190 degrees. The heating temperature in the primary storage process may be less than the heating temperature in the secondary storage process. Optionally, the storage process may include a process of cooling the support. After the process of drying or heating the support is performed, the process of cooling the support may be performed. As a second example, the storage process may include a process of storing the support in a state of a temperature less than atmospheric pressure. Thus, the outgassing form the support may be performed. The storage pressure may be less than a pressure in a vacuum state in which the internal space between the first plate and the second plate is maintained. The storage pressure may be greater than $10E-10$ torr and less than atmospheric pressure. The storage pressure may be greater than $10E-9$ torr and less than atmospheric pressure. The storage pressure may be greater than $10E-8$ torr and less than atmospheric pressure. The storage pressure may be greater than $10E-7$ torr and less than atmospheric pressure. The storage pressure may be in a state of being greater than $10E-3$ torr and less than atmospheric pressure. The storage pressure may be in a state of being greater than $10E-2$ torr and less than atmospheric pressure. The storage pressure may be in a state of being greater than $0.5E-1$ torr and less than atmospheric pressure. The storage pressure may be in a state of being greater than $0.5E-1$ torr and less than $3E-1$ torr. The storage pressure in the primary storage process may be higher than the storage pressure in the secondary storage process. Optionally, the storage process may include a storage process at the atmospheric pressure. After the process of storing the support in a state of the pressure less than the atmospheric pressure is performed, the process of storing the support in the state of the atmospheric pressure may be performed.

Optionally, before the vacuum adiabatic body vacuum exhaust process is performed, a process of coupling a plurality of portions of the support to each other may be performed. For example, the coupling process may include a process of coupling a bar of the support to a connection plate. As another example, the coupling process may include a process of coupling the bar of the support to the support plate.

The process associated with the support may optionally include a process related to the process of storing the support under the predetermined condition. An example of a process sequence related to the process in which the support is stored under the predetermined condition is as follows. The present disclosure may be any one of the following examples or a combination of two or more examples. After the process of drying or heating the support is performed, at least one of the process of storing the support at the temperature less than atmospheric pressure, the process of cooling the support, or the process of storing the support at the atmospheric pressure may be performed. After the process of storing the support at the pressure less than the atmospheric pressure is performed, at least one of the process of drying or heating the support, the process of cooling the support, or the process of storing the support at the atmospheric pressure may be performed. The process of drying or heating the support and the process of storing the support at the pressure less than the atmospheric pressure may be performed at the same time. The process of drying or heating the support and the process of storing the support at the atmospheric pressure may be performed at the same time. The process of storing the support under the condition less than atmospheric pressure and the process of cooling the support may be performed at the same time.

The process associated with the support may optionally include a process related to the process in which the support is coupled. An example of a process sequence related to the process in which the support is coupled is as follows. The present disclosure may be any one of the following examples or a combination of two or more examples. Before the coupling process is performed, a process of providing a separate component separated from the support in a space provided inside the support may be performed. For example, the component may include a heat transfer resistor. After the coupling process is performed, the support may be packaged or stored in a vacuum state. After the process of storing the support under the predetermined condition is performed, a process of coupling a plurality of portions of the support to each other may be performed.

In relation to the support, the process may optionally include a process related to the process of washing the support. An example of a process sequence related to the process of washing the support is as follows. The present disclosure may be any one of the following examples or a combination of two or more examples. After the process of manufacturing the support is performed, at least one of the process of washing the support, the process of storing the support under the predetermined condition, or the process of coupling the plurality of portions of the support to each other may be performed. After the process of washing the support is performed, at least one of the process of storing the support under the predetermined condition or the process of coupling the plurality of portions of the support to each other may be performed. Before the process of washing the support is performed, at least one of the process of storing the support under the predetermined condition or the process of coupling the plurality of portions of the support to each other may be performed.

The process associated with the support may optionally include a process related to the process of providing the support to plate. An example of a process sequence related to the process of providing the support to the plate is as follows. The present disclosure may be any one of the following examples or a combination of two or more examples. Before the vacuum adiabatic body exhaust process is performed, the support may be provided in a space between the first plate and the second plate. Before the vacuum adiabatic body exhaust process is performed, the support may be provided at the inside of the plate or the surface of the plate. Before the vacuum adiabatic body vacuum exhaust process is performed, the support may be coupled to the plate. After the component coupling portion is provided on a portion of the plate, the support may be provided in the space between the first plate and the second plate.

The contents described in FIGS. 1 to 11 may be applied to all or selectively applied to the embodiments described with reference to the drawings below.

FIG. 12 is a set of a perspective view and a partial cross-sectional view of a vacuum adiabatic body, FIG. 12a is a diagram showing a vacuum adiabatic body with a left side being a bottom and a right side being a top, FIG. 12b is a sectional perspective view taken along 1-1' of FIG. 12a, and FIG. 12c is a cross-sectional view taken along 1-1'. In the drawings, a foam member is removed.

Referring to FIG. 12, the vacuum adiabatic body may be used in a door for opening and closing the accommodation space. A hinge may be installed on a first side of the vacuum adiabatic body. The first side may be provided thinner than the second side to prevent interference when the door is opened and closed. The first side may be provided with the additional adiabatic body 90 thinner than the second side. The first side and the second side may be positioned to face each other. The first side may correspond to a side A in FIG. 12a and the second side may correspond to a side B in FIG. 12a. Sides C and D that connect the sides A and B may each have a thickness that gradually changes. Here, the side C may be a third side that is an upper side of the vacuum adiabatic body, and the side D may be a fourth side that is a lower side of the vacuum adiabatic body.

The description of the sides may also be applied in the same way to the first plate 10, the second plate 20, the side plate 15, the additional adiabatic body 90, and the gasket 80. For example, the first and second plates may each be provided in a square shape. For example, the side plate may each be provided in a square shape having four sides.

According to one or more embodiments, the tube 40 may be provided at a portion in which the vacuum space 50 and the additional adiabatic body 90 are in contact with each other. The tube 40 may be provided at a place where the vacuum space 50 and the additional adiabatic body 90 come into contact. A first end of the tube 40 may be positioned in the vacuum space 50, and a second end of the tube 40 may be positioned in the additional adiabatic body 90. The tube 40 may protrude into the additional adiabatic body 90. The other end of the tube 40 may not protrude into the accommodation space to prevent waste of the accommodation space. The foam insulator may be an insulator that solidifies after the foaming solution is injected into a periphery of the vacuum adiabatic body and expanded. The foaming solution may be, for example, polyurethane. The foam insulator may generate a high pressure during an expansion process. The foam insulator may penetrate into a narrow space of the periphery. The tube 40 may not cross an outer boundary of the additional adiabatic body 90. The tube 40 may be embedded in the additional adiabatic body 90 and the vacuum space 50. Examples of the aforementioned tube may include a port such as an exhaust port or a getter port.

Optionally, the height of the tube 40 may be ensured more than twice the diameter of the tube 40. Pinch-off may be performed after exhaust through the tube 40 is completed. Compression deformation may spread during the pinch-off. The spreading deformation may prevent the tube 40 and a coupler of the plate from being deformed and damaged. The tube 40 may be positioned at a corner 211 opposite to an upper hinge among four corners 211 of the vacuum adiabatic body. The tube 40 may be positioned above the vacuum adiabatic body to prevent the tube 40 from being damaged. Examples of the aforementioned tube may include a port such as an exhaust port or a getter port.

Optionally, the foaming solution may be injected downward from the top of the vacuum adiabatic body to use gravity. A lower part of the vacuum adiabatic body may first be filled with the foaming solution. When the foaming solution is filled, the foaming solution may be drawn downward in a direction of gravity. Expansion force of the foaming solution may be greater in the lower part of the vacuum adiabatic body than in the upper part. The foaming solution placed in the lower part of the vacuum adiabatic body may have large expansion force due to a pressure of the foaming solution in the upper part and restrictions of a foaming space due to the foaming solution that is first solidified in the upper part. In order to reduce an effect of the expansion force of the foaming solution on the tube 40, the tube 40 may be provided above the vacuum adiabatic body. In order to minimize an effect of the expansion force of the foaming solution on the tube 40, the tube 40 may be provided in the first portion 101 of the first plate on the upper side of the vacuum adiabatic body. When ductile copper is used as a material of the tube 40, the tube 40 may be directly deformed. Examples of the aforementioned tube may include a port such as an exhaust port or a getter port.

Optionally, in order to reduce an effect of a local difference in the expansion force of the foaming solution on the tube 40, the tube 40 may be provided above the vacuum adiabatic body. The tube 40 may be provided in the first portion 101 of the first plate on the upper side of the vacuum adiabatic body. The tube 40 may be spaced apart from the side plate 15 of the vacuum adiabatic body by a predetermined interval W1. Since the foaming solution solidifies multiple times, the expansion force of the foaming solution may vary locally. For example, the expansion force of the right foaming solution of the tube 40 may be larger than the expansion force of the left foaming solution of the tube 40. In this case, the tube 40 may be damaged. Damage of the tube 40 may include deformation of a coupler of the tube 40 and the first plate 10, and expansion damage of seals of the first plate 10 and the tube 40. Examples of the aforementioned tube may be ports such as an exhaust port or a getter port.

Optionally, in the vacuum adiabatic body, the thickness of an insulator on a side on which the hinge is placed may be thinner than on the opposite side. The tube 40 may be placed at an opposite side to the hinge in the vacuum adiabatic body to reduce insulation loss. The opposite side to the hinge in the vacuum adiabatic body may refer to an opposite side to the side on which the hinge is installed. Examples of the aforementioned tube may be ports such as an exhaust port or a getter port.

Optionally, the tube 40 may have a long elongated portion protruding into the additional adiabatic body 90. The tube 40 may provide a heat conduction path for heat passing through the tube 40. The tube 40 may provide a place therefor to be positioned by excluding the foaming solution that forms the additional adiabatic body 90. The tube 40 may cause insulation loss of the vacuum adiabatic body. In order to reduce insulation loss due to the tube 40, the tube 40 may be placed at an opposite side to the hinge in the vacuum adiabatic body having the additional adiabatic body 90 having a relatively large thickness. The tube 40 may be provided at the first portion 101 of the first plate on the opposite side to the hinge of the vacuum adiabatic body. Examples of the aforementioned tube may be ports such as an exhaust port or a getter port.

FIG. 13 is a set of a sectional perspective view and a cross-sectional view for explaining a section taken along 2-2' of FIG. 12*a*, FIG. 12*a* is a sectional perspective view, and FIG. 12*b* is a cross-sectional view.

Referring to FIG. 13, the foaming solution may be injected through a foaming solution inlet 470. The foaming solution inlet 470 may not be aligned vertically with the tube 40. The tube 40 may avoid a passage of the foaming solution. The foaming solution injected through the foaming solution inlet may flow down to a lower end of the vacuum adiabatic body without being caught in the tube 40. Examples of the aforementioned tube may be ports such as an exhaust port or a getter port.

In detail, a distance W1 between the tube 40 and the side plate 15 may be smaller than a distance W2 between the tube 40 and an upper cover 112. The upper cover 112 may be placed on an edge of the third side. A lower cover 113 may be placed on the fourth side of the vacuum adiabatic body, which faces the upper cover 112. Examples of the aforementioned tube may be ports such as an exhaust port or a getter port.

FIGS. 14 to 16 are drawings related to a section taken along 3-3' of FIG. 12*a*, FIG. 14 is a cross-sectional view taken along 3-3' of FIG. 12*a*, FIG. 15 is an enlarged view of a section of a portion Z of FIG. 14, and FIG. 16 is a sectional perspective view.

Referring to FIGS. 14 to 16, the thickness of the vacuum adiabatic body on the second side may be thicker than the thickness on the first side. The thickness of the additional adiabatic body 90 on the second side may be thicker than the thickness on the first side. Here, the thickness of the vacuum adiabatic body may refer to a height between the first and second plates 10 and 20. The height of the vacuum space 50 on the first side and the second side may be the same.

Optionally, a distance W3 to the tube 40 from the third portion 203 of the second plate at the second side may be smaller than the distance W2 between the tube 40 and the upper cover 112. Accordingly, insulation loss leaking above the tube 40 may be further reduced. An imaginary extension line (the X-axis direction) of the second portion 152 of the side plate may pass through the tube 40 at the second side. Thus, insulation loss leaking toward the second side of the vacuum adiabatic body in the tube 40 may be reduced. The third portion 203 of the second plate may be placed at edges of the first side and/or the second side. Examples of the aforementioned tube may be ports such as an exhaust port or a getter port.

Optionally, a flange 42 may be provided on the first plate 10 in order to couple the tube 40 to the first plate 10. The flange 42 may extend into the vacuum space 50. In this case, the tube 40 may be easily inserted into the flange 42. In this case, even if the first plate is coupled to the second plate, the tube 40 may be easily coupled to the flange 42. The flange 42 may extend out of the vacuum space 50. Interference between the flange 42 and components placed inside the vacuum space 50 may be prevented. The flange 42 may overlap the first space in the first portion 101 of the first plate. In this case, insulation loss of the additional adiabatic body 90 may be reduced. Here, overlapping may mean being aligned in a height direction of the vacuum space 50. Examples of the aforementioned tube may be ports such as an exhaust port or a getter port.

An embodiment of the position and properties of the flange 42 will be proposed.

FIGS. 17 and 18 are diagrams showing a flange according to embodiments and propose the cases with different extension directions of flanges and different positions of the flanges according to embodiments.

FIGS. 17*a* and 17*b* show the case in which the flange 42 extends out of the vacuum space 50. FIGS. 18*a* and 18*b* show the case in which the flange 42 extends into the vacuum space 50. FIGS. 17*a* and 18*a* show the case in which the flange 42 overlaps the additional adiabatic body 90 in the first portion 101 of the first plate. FIGS. 17*b* and 18*b* show the case in which the flange 42 overlaps the first space in the first portion 101 of the first plate.

According to a first embodiment of FIG. 17*a*, the accommodation space may be ensured to be wide. The flange 42 may be prevented from interfering with the support 30 and the heat transfer resistor. According to the present embodiment, the support 30 and the heat transfer resistor may be installed using various methods. According to the present embodiment, the support 30 and the heat transfer resistor may be installed in plural.

According to a second embodiment of FIG. 17*b*, insulation loss of the additional adiabatic body 90 due to the tube 40 may be reduced. The flange 42 may be prevented from interfering with the support 30 and/or the heat transfer resistor. According to the present embodiment, the support 30 and/or the heat transfer resistor may be installed using various methods. According to the present embodiment, the support 30 and the heat transfer resistor may be installed in plural. According to the present embodiment, a through hole 170 through which the tube passes may be provided in an internal panel 111. A diameter of the through hole 170 of the internal panel 111 may be larger than an external surface of the flange 42. The flange 42 and the through hole may be spaced apart from each other. When the tube 40 has a circular shape, an outer diameter of the tube 40 may be smaller than an inner diameter of the through hole 170. The through hole of the internal panel 111 may be inclined or rounded to correspond to the shape of the flange 42. Examples of the aforementioned tube may be ports such as an exhaust port or a getter port.

According to a third embodiment of FIG. 18*a*, the accommodation space may be ensured to be wide. The tube 40 may be conveniently inserted along the flange 42.

According to a fourth embodiment of FIG. 18*b*, insulation loss of the additional adiabatic body 90 due to the tube 40 may be reduced. The tube 40 may be conveniently inserted along the flange 42. According to the present embodiment, the tube 40 may entirely pass through the first portion 101 of the first plate. According to the present embodiment, the tube 40 may penetrate the internal panel 111. The through hole 170 may be provided through the internal panel 111. Examples of the aforementioned tube may be ports such as an exhaust port or a getter port.

FIG. 19 is a cross-sectional view of a periphery of a vacuum adiabatic body according to an embodiment.

Referring to FIG. 19, the body 2 may have various thicknesses. The internal surface of the body may have various position relationships with respect to the vacuum adiabatic body. For example, an extension line L1 of the internal surface of the body may overlap the second portion 102 of the first plate (a). Here, the extension line L1 of the internal surface of the body may extend in a height direction (the Y-axis direction) of the vacuum space 50. This case may be simply considered as the case in which the internal surface of the body overlaps the second portion 102 of the first plate. In another case, the extension line of the internal surface of the body may be positioned out of the second portion 102 of the first plate (b), and may also be positioned inside the second portion 102 of the first plate (c). An embodiment will be described with reference to an example in which the internal surface of the body overlaps the second portion 102 of the first plate (a).

When the door is opened and closed, a load may be transferred to the support 30 along the extension line of the internal surface of the body 2. The dynamic load of the load may have a large influence. The dynamic load may include an impact applied to the door by the body 2 when the door is opened and closed. The dynamic load may include a shock wave caused by a change in air flow in and out of the accommodation space, which occurs while the door is opened and closed. The shock wave may be generated along the internal surface of the body. The shock wave may be generated along the extension line of the internal surface of the body.

In order to prevent the support 30 from being damaged due to the load, the support 30 may have the following configuration. A region of the support 30, which overlaps the extension line of the internal surface of the body, may have high strain resistance or failure strength compared with a region of the support 30, which does not overlap the extension line. A region of a support plate 340, which overlaps the extension line of the internal surface of the body, may have a high strain resistance or failure strength compared with a region of the support plate 340, which does not overlap the extension line. The support plate 340 that overlaps the extension line of the internal surface of the body may have a large thickness compared with the support plate 340 that does not overlap the extension line. The bar 31 adjacent to the extension line of the internal surface of the body may have a high strain resistance or failure strength compared with the bar 31 that is not adjacent to the extension line. The bar 31 adjacent to the extension line of the internal surface of the body may have a large cross-sectional area compared with the bar 31 that is not adjacent to the extension line. A pitch of the bar 31 that overlaps or is adjacent to the extension line of the internal surface of the body may be larger than a pitch of the bar 31 that is not adjacent to the extension line. The extension line of the internal surface of the body and at least one of the bar 31 may overlap each other.

FIG. 20 is a cross-sectional view of another periphery of a vacuum adiabatic body according to an embodiment.

Referring to FIG. 20, the first plate 10 may have a hanger 130 by which a predetermined article is supported. The hanger 130 may be, for example, a basket hanger by which a basket is supported. The basket hanger may be placed on a door of a refrigerator. The basket may be placed on the door of the refrigerator and may accommodate an article. When an article is accommodated in the basket, the basket and/or the basket hanger may apply a load to the first plate 10. The load may deform or damage each component of the vacuum adiabatic body.

The load may include a static load applied to the first plate as the gravity of the article placed in the basket. An impact applied when the article is placed in the basket may include a dynamic load applied to the first plate 10.

A basket protrusion of the basket may be inserted between the basket hanger and the first plate 10. Both of the basket and the basket hanger may apply a static load and a dynamic load to the first plate 10. A protrusion of the basket may be tightly fit between the basket hanger and the first plate 10. In this case, the basket protrusion may also apply directly to the first plate 10.

The load may include a static load due to gravity, a static load of the basket protrusion, and/or a dynamic load of an accommodated article.

The load generated due to the basket hanger may be transferred to the support 30 through the second portion 102 of the first plate and the first portion 101 of the first plate. The support 30 may be deformed or damaged due to the load.

In order to prevent the support 30 from being damaged due to the load, the support 30 may have the following configuration. Extension lines L2 and L3 along which the basket hanger extends in a height direction of the vacuum space 50 may be provided. A region of the support 30, which is placed in a gap between the extension lines, may have high strain resistance or failure strength compared with a region of the support 30, which does not overlap the gap between the extension lines.

In more detail, a region of the support plate 340, which overlaps the gap between the extension lines of the basket hanger, may have high strain resistance or failure strength compared with a region of the support plate 340, which does not overlap the gap between the extension lines. The support plate 340 that overlaps the gap between the extension lines of the basket hanger may have a large thickness compared with the support plate 340 that does not overlap the gap between the extension lines. The bar 31 adjacent to the gap between the extension lines of the basket hanger may have high strain resistance or failure strength compared with the bar 31 that is not adjacent to the gap between the extension lines. The bar 31 adjacent to the gap between the extension lines of the basket hanger may have a large cross-sectional area compared with the bar 31 that is not adjacent to the gap between the extension lines. A pitch of a bar that overlaps or is adjacent to the gap between the extension lines of the basket hanger may be larger than a pitch of a bar that is not adjacent to the gap between the extension lines. The extension line of the basket hanger and at least one of the bar may overlap each other. The basket hanger may be positioned adjacent to a vertex formed between the first portion 101 of the first plate and the second portion 102 of the first plate.

According to the present disclosure, the vacuum adiabatic body may include the first plate 10 having a first temperature, the second plate 20 having a second temperature different from the first temperature, and a seal for sealing the first plate and the second plate to provide the vacuum space 50. Optionally, the vacuum adiabatic body may be manufactured by a vacuum adiabatic body component preparation process in which the first plate and the second plate are prepared in advance, a vacuum adiabatic body component assembly process in which the prepared first plate and second plate are assembled, and a vacuum adiabatic body vacuum exhaust process in which a gas in the space defined between the first plate and the second plate is discharged after the component assembly process. Optionally, the vacuum adiabatic body may be manufactured by a vacuum adiabatic body component sealing process in which the space between the first plate and the second plate is sealed prior to the vacuum adiabatic body vacuum exhaust process. Optionally, after the vacuum adiabatic body vacuum exhaust process, an apparatus assembly process in which the vacuum adiabatic body is combined with the components constituting the apparatus may be performed.

Optionally, the vacuum adiabatic body may include a component connected to the additional adiabatic body 90. Examples related to the component are as follows. The present disclosure may be any one of the following examples, or an example in which two or more examples are combined. The component may include a latch 81. The component may include a first portion and a second portion that is connected to the first portion and is provided. The first portion may include a portion having a lower heat transfer resistance than the second portion. The first portion may be moveably provided. The component may be provided in a central portion of the additional adiabatic body. The component may be accommodated in a groove formed in the additional adiabatic body. The length of the groove in the Y-axis direction may be greater than ½ of the height of the additional adiabatic body in the Y-axis direction.

Optionally, the vacuum adiabatic body may include a second additional adiabatic body that is provided separately from the additional adiabatic body 90. The second additional adiabatic body may have the following examples. The present disclosure may be any one of the following examples or a combination of two or more examples. The second additional adiabatic body may have a smaller height than the additional adiabatic body in the Y-axis direction. The second additional adiabatic body may have a smaller volume than the additional adiabatic body. The second additional adiabatic body may include a portion to which a component separated from the component 81 is connected. The separate component may include a hinge. The separate component may be provided not to overlap a portion of the side plate in a height direction (the Y-axis direction) of the vacuum space. The portion of the side plate may include a portion that extends in the height direction of the vacuum space. The portion of the side plate may be positioned within the additional adiabatic body. The portion of the side plate may be spaced apart from the component by a predetermined distance in a longitudinal direction (the X-axis direction) of the vacuum space. The predetermined distance may be greater than the height of the vacuum space. The portion of the side plate may be provided to overlap the component in the longitudinal direction of the vacuum space. The component may be provided not to overlap a portion of the support 30 in the height direction of the vacuum space. The portion of the support 30 may include the bar 31. The portion of the support 30 may include the bar and an additional bar that is adjacent to the bar and is spaced apart from the bar by a predetermined distance. The portion of the support 30 may be spaced apart from the component by a predetermined distance in the longitudinal direction of the vacuum space. The predetermined distance may be greater than the height of the vacuum space. The portion of the support 30 may be provided to overlap the component in the longitudinal direction of the vacuum space.

FIG. 21 is a cross-sectional view of a periphery of a vacuum adiabatic body.

Referring to FIG. 21, the latch 81 and the support 30 may overlap each other in a height direction of the vacuum space 50. A region in which the latch 81 is placed may be defined by two imaginary lines L1 and L2 in the height direction of the vacuum space 50. The two imaginary lines may be spaced apart from each other in a longitudinal direction of the vacuum space 50 by a predetermined distance. At least a portion of the support 30 may be placed in the region between the two imaginary lines. The latch 81 and the support 30 may be spaced apart from each other in the height direction of the vacuum space 50. The latch 81 and the support 30 may be adjacent to each other in the height direction of the vacuum space 50. At least one bar of the support 30 may be positioned in the region between the two imaginary lines. The latch 81 and the vacuum adiabatic body may be in contact with each other.

The latch 81 may be a member that receives a primary impact when the door is opened and closed. The impact of the latch 81 may be transferred to the additional adiabatic body 90. A foam member of the additional adiabatic body 90 may surround the latch 81. The foam member of the additional adiabatic body 90 may be damaged by repeated impacts. When the foam member is damaged, a gap may be generated. Thermal energy may easily flow through the gap. Insulation loss may be caused in the gap. The gap may interfere with the action of at least one of a magnet, a rod, the gasket 80, a switch, a damper, a power switch, a heater mounted inside the door, an electric wire, and a water supply line, which are placed in the additional adiabatic body 90.

The impact of the latch 81 may be transferred to the vacuum adiabatic body. The impact may be transferred to the support 30 and may be diffused. The foam member may not be broken due to the impact dispersing action of the support 30.

In the case of a door in door refrigerator, the latch 81 may be installed in door among two doors. The latch 81 may couple an inner door to an outer door. The doors may be locked via coupling. The latch may be a device that is installed on the door. The latch may couple and/or lock the door to the body 2.

FIG. 22 is a diagram showing comparison between a cross-sectional view at the second side of the vacuum adiabatic body and a cross-sectional view at the first side of the vacuum adiabatic body.

Referring to FIG. 22, a portion at the second side of the vacuum adiabatic body and a portion at the first side of the vacuum adiabatic body may be different from each other. The additional adiabatic body may differ at the first and second sides of the vacuum adiabatic body. A space in which the additional adiabatic body is placed may be defined as an internal portion of at least one of the first plate 10, the second plate 20, and the side plate 15. The additional adiabatic body 90 may use a foam insulator or various insulating materials such as pre-molded resin.

An insulating area (XY plane) of the additional adiabatic body 90 at the second side may be larger than at the first side. An insulating thickness of the height direction (the Y-axis direction) of the vacuum space 50 of the additional adiabatic body 90 at the second side may be larger than at the first side. Accordingly, more additional adiabatic bodies 90 may insulate the portion at the second side, and a component such as the latch 81 may reinforce insulation performance of the portion at the second side. An insulating thickness of the additional adiabatic body 90 at the first side in the longitudinal direction (the X-axis direction) of the vacuum space 50 may be larger than at the second side. Thus, insulation loss leaking to an edge at the first side may be reduced.

An insulation thickness change rate of the additional adiabatic body 90 at the first side in the height direction (the Y-axis direction) of the vacuum space 50 may be larger than at the second side. Thus, it may be possible to minimize interference of components according to opening and closing of a door on a side on which a hinge is placed while reducing insulation loss. Accordingly, an inclination angle A of the second portion 202 of the second plate may be relatively large at the first side. The second portion 202 of the second plate may interfere with an external object, but the inclination angle A of the second portion 202 of the second plate may be large, thereby preventing the interference.

The additional adiabatic body 90 may use a foam insulator. The foam insulator may be formed by injecting and then solidifying a foaming solution. The foaming solution may be a fluid and may be affected by a hydraulic diameter of a space into which the foaming solution is injected. The hydraulic diameter may be proportional to the insulating area and inversely proportional to the length of the curve surrounding the insulating area. The hydraulic diameter at the second side may be larger than at the first side. The foaming solution may smoothly flow at the second side than at the first side. The foaming solution may be filled larger at the second side than at the first side. When a large amount of the foaming solution is injected, a greater foaming pressure may be applied.

The hydraulic diameter at the second side may be larger than at the first side, and thus the foaming solution at the first side may not smoothly flow. In order to improve the fluidity of the foaming solution, the second portion 152 of the side plate at the first side may not extend to a component. In order to improve the fluidity of the foaming solution, the second portion 152 of the side plate at the first side may be maintained to be spaced apart from the component at a predetermined interval in the longitudinal direction (the X-axis direction) of the vacuum space 50. In order to improve the fluidity of the foaming solution, the second portion 152 of the side plate at the first side may not overlap the component in the height direction (the Y-axis direction) of the vacuum space 50. Here, the component may include a hinge.

The fluidity of the foaming solution at the second side may not be poor, but the position of each member may be changed or a member may be deformed due to a high foaming pressure. The second portion 152 of the second plate at the second side may extend over a component in the longitudinal direction (the X-axis direction) of the vacuum space 50. Thus, the second portion 152 of the side plate and the component may interact to maintain a positional relationship between members according to a design. The second portion 152 of the side plate at the second side may overlap the component in the height direction (the Y-axis direction) of the vacuum space. Accordingly, the second portion 152 of the side plate and the component may interact to maintain a positional relationship between members according to a design. Here, the component may include the latch 81. In addition, various components may be in contact with each other, may be supported by each other, or may be fixed to each other. Movable members such as the latch 81 exposed to external shocks may maintain original design positions thereof due to the interconnection structure.

The positional relationship between the second portion 152 of the side plate and the component may also be applied in the same way to the support 30, the heat transfer resistor 32, and a vacuum insulation extension. The heat transfer resistor may be a radiation resistance sheet.

A hinge including a hinge shaft 21 may be placed at the first side. The latch 81 may be placed at the second side. At least a portion of the latch may be accommodated in a component accommodation space 830. The component accommodation space 830 may accommodate various components such as the latch. The additional adiabatic body 90 may not be placed in the component accommodation space 830. The additional adiabatic body 90 may not interfere with the action of the component.

The component accommodation space 830 may be protected by a component case 810 that is opened upward in the height direction (the Y-axis direction) of the vacuum space. The component case 810 may provide a lower wall of the component accommodation space 830. The component case 810 may have a lower part 811 adjacent to the second portion 152 of the side plate. The component case 810 may have an internal part 812 adjacent to a central part of the vacuum space. The component case 810 may have an outer part 813 adjacent to a periphery of the vacuum space. The component case 810 may be provided as a single body. The second portion 102 of the first plate may have a gasket accommodation part 103 on which the gasket 80 is placed. The second portion 102 of the first plate may have a plurality of bent sections. The second portion 102 of the first plate may have fourth and fifth portions 107 and 105 of the first plate, which extend in the height direction of the vacuum space. The fourth portion 107 of the first plate may be aligned with the internal part 812. The fourth portion 107 of the first plate may be more adjacent to the component accommodation space 830 than the internal part 812. The second portion 102 of the first plate may have a step difference 108. An upper end of the internal part 812 may be in contact with a lower end of the step difference 108. A foaming solution may not flow between the internal part 812 and the fourth portion 107 of the first plate. The fifth portion 105 of the first plate may be aligned with the outer part 813. The fifth portion 105 of the first plate may be more adjacent to the component accommodation space 830 than the outer part 813. The fifth portion 105 of the first plate may include a stair portion 1051. An upper end of the outer part 813 may be in contact with a lower end of the stair portion 1051. A foaming solution may not flow between the outer part 813 and the fifth portion 105 of the first plate. The second portion 102 of the first plate may include a sixth portion 106 of the first plate, which is in contact with the second plate 20. The second plate 20 and the sixth portion 106 of the first plate may be fixedly coupled to each other.

An upper wall of the component accommodation space 830 may be provided by a component cover 820. The component cover 820 may have a step difference. The component cover 820 may include a plate corresponding surface 822 having the same height as that of the sixth portion 106 of the first plate. The component cover 820 may include a through hole 823. The through hole 823 may be provided in the plate corresponding surface 822. The component cover 820 may include a gasket accommodation portion 821 on which the gasket is accommodated. The gasket accommodation portion 821 and the plate corresponding surface 822 may have different heights in the height direction of the vacuum space. At least a portion of a latch, for example, a flange may protrude out of the through hole 823. The flange may be caught by the body.

After the component case 810 and the first plate 10 are coupled to each other, the latch 81 may be placed. After the latch 81 is placed, the component cover 820 may be coupled thereto. After coupling the component cover 820, the gasket 80 may be coupled.

Referring to FIG. 23, at least one of the internal panel 111, an external panel 112, the upper cover 112, the lower cover 113, and the latch 81 may be further installed. A space into which a foaming solution is injected may be formed by the internal panel 111, the external panel 112, the upper cover 112, the lower cover 113, the vacuum adiabatic body, and the like. The foaming solution may be injected to form the additional adiabatic body 90.

The latch 81 may have a portion that extends a long way in the depth direction (the Z-axis direction) of the vacuum space. The extending portion may extend a long way vertically inside the component accommodation space 830. A lower end of the latch may reach a lower end of the vacuum adiabatic body. An upper end of the latch may reach a middle part of the vacuum adiabatic body. An operation knob may be provided on the lower end of the latch. The flange may be provided on the upper end of the latch. The operation knob may be operated by a user. The flange may be related by operating the operation knob by the user. A door may be opened by operating the operation knob.

INDUSTRIAL APPLICABILITY

The present disclosure may provide a vacuum adiabatic body applicable to a real life.

The invention claimed is:

1. A refrigerator comprising:
a body having an opening; and
a door configured to open and close relative to the body, wherein the door includes:
a first plate;
a second plate spaced apart from the first plate in a first direction to form a space between the first plate and the second plate; and
a support provided between the first plate and the second plate,
wherein the support includes a first part that overlaps an extension line that extends in the first direction from an internal surface of the body, and a second part that does not overlap the extension line, and
wherein the support is configured such that the first part has a higher strain resistance or failure strength than the second part.

2. The refrigerator of claim 1, wherein the door includes a basket hanger configured to support a basket, and the basket hanger extends from a first end to a second end,
wherein the support includes a third part disposed in a gap between a first extension line extending in the first direction and a second extension line extending in the first direction, and a fourth part that does not overlap the gap between the first and second extension lines, and
wherein the support is configured such that the third part has a higher strain resistance or failure strength than the fourth part.

3. A vacuum adiabatic body comprising:
a first plate;
a second plate spaced apart from the first plate in a first direction to form a vacuum space between the first plate and the second plate;
a support provided between the first plate and the second plate;
an inner panel that includes a first portion configured to cover a part of the first plate, and a second portion that extends away from the first portion; and
a hanger disposed on the second portion of the inner panel, and configured to support an article, the hanger having a first end at the second portion of the inner panel and extending from the first end to a second end of the hanger,
wherein the support includes a first part disposed in a gap between a first extension line extending from the first end of the hanger in the first direction and a second extension line extending from the second end of the hanger in the first direction, and
a second part that does not overlap the gap between the first and second extension lines, and
wherein the support is configured such that the first part has a higher strain resistance or failure strength than the second part.

4. The vacuum adiabatic body of claim 3, wherein the support includes a support plate having a first plate part and a second plate part,
wherein the first plate part of the support plate is disposed to overlap a gap between a first extension line extending from the first end of the hanger in the first direction and a second extension line extending from the second end of the hanger in the first direction, and
the second plate part of the support plate does not overlap the gap between the first and second extension lines, and
wherein the support plate is configured such that the first plate part has a higher strain resistance or failure strength than the second plate part.

5. The vacuum adiabatic body of claim 3, wherein the support includes a first support plate having a first plate part and a second plate part,
wherein the first plate part is disposed to overlap a gap between extension lines extending in the first direction from the hanger, and
the second plate part does not overlap the gap between the extension lines, and
wherein a thickness of the first plate part in the first direction is greater than a thickness of the second plate part in the first direction.

6. The vacuum adiabatic body of claim 3, wherein the support includes a first bar and a second bar between the second plate and the first plate, and
wherein the first bar is next to a gap between extension lines extending in the first direction from the hanger, the second bar is not next to the gap between the extension lines and the first bar has a higher strain resistance or failure strength than the second bar.

7. The vacuum adiabatic body of claim 3, wherein the support includes a first bar and a second bar between the second plate and the first plate, and
wherein the first bar disposed next to a gap between extension lines extending in the first direction from the hanger is higher than the second bar that is not next to the gap between the extension lines.

8. The vacuum adiabatic body of claim 3, wherein a pitch of a first bar that overlaps a gap between extension lines extending in the first direction from the hanger is larger than a pitch of a second bar that does not overlap the gap between the extension lines.

9. The vacuum adiabatic body of claim 3, wherein a gap is between extension lines extending in the first direction from the hanger, and at least one bar overlaps one of the extension lines.

10. The vacuum adiabatic body of claim 3,
wherein the hanger is positioned next to a gap between the first plate and the second portion of the inner panel.

11. The vacuum adiabatic body of claim 3, wherein the hanger is a basket hanger.

12. A vacuum adiabatic body comprising:
a first plate;
a second plate spaced apart from the first plate in a first direction to form a vacuum space between the first plate and the second plate; and
a support provided between the first plate and the second plate,
wherein the support is configured such that a component at least partially overlaps the support in the first direction, and
wherein the component includes a latch.

13. The vacuum adiabatic body of claim 12, wherein the latch is spaced apart from the support in the first direction.

14. The vacuum adiabatic body of claim 12, wherein the support includes a bar that extends in the first direction between the first plate and the second plate.

15. The vacuum adiabatic body of claim 12, wherein the latch is next to the support in the first direction.

16. The vacuum adiabatic body of claim 12, wherein the component is disposed at a region defined by two imaginary lines that extend in the first direction, and
at least a portion of the support is disposed in a region between the two imaginary lines.

17. The vacuum adiabatic body of claim 12, wherein the support includes two bars extending in the first direction and a connection plate that connects the two bars, and
the component is disposed at a region defined by two imaginary lines that extend in the first direction, and at least a portion of the connection plate is disposed in a region between the two imaginary lines.

18. The vacuum adiabatic body of claim 12, comprising:
a coupler to couple to at least one of the first and second plates, and the coupler is configured to receive the component.

* * * * *